(12) United States Patent
Zhou

(10) Patent No.: US 11,784,727 B2
(45) Date of Patent: Oct. 10, 2023

(54) TRANSMISSION CHANNEL CALIBRATION APPARATUS AND WIRELESS COMMUNICATIONS DEVICE

(71) Applicant: HUAWEI TECHNOLOGIES CO., LTD., Shenzhen (CN)

(72) Inventor: Mu Zhou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/558,949

(22) Filed: Dec. 22, 2021

(65) Prior Publication Data

US 2022/0116126 A1 Apr. 14, 2022

Related U.S. Application Data

(63) Continuation of application No. PCT/CN2019/093895, filed on Jun. 28, 2019.

(51) Int. Cl.
*H04B 17/14* (2015.01)
*H04B 7/06* (2006.01)
(Continued)

(52) U.S. Cl.
CPC .......... *H04B 17/14* (2015.01); *H04B 7/0619* (2013.01); *H04W 24/10* (2013.01); *H04L 5/0051* (2013.01)

(58) Field of Classification Search
CPC ..... H04B 17/14; H04B 7/0619; H04W 24/10; H04L 5/0051
See application file for complete search history.

(56) References Cited

U.S. PATENT DOCUMENTS

| 2011/0279334 A1 | 11/2011 | Smith, Jr. et al. |
| 2012/0146841 A1 | 6/2012 | Ookawa |

(Continued)

FOREIGN PATENT DOCUMENTS

| CN | 103229471 A | 7/2013 |
| CN | 203406882 U | 1/2014 |

(Continued)

OTHER PUBLICATIONS

Extended European Search Report issued in corresponding European Application No. 19935109.9, dated May 23, 2022, pp. 1-7.

(Continued)

*Primary Examiner* — Duc C Ho
(74) *Attorney, Agent, or Firm* — HAUPTMAN HAM, LLP

(57) ABSTRACT

A method includes a first port including a first measured channel, a second port including a second measured channel, a third port including a first reference channel, and a fourth port including a second reference channel, and a vector detector configured to perform detection based on a first and second feedback signal that are respectively output by the first and second reference channel to thereby obtain a first and second signal vector in response to the first port transmitting a first signal, and perform detection based on a third and fourth feedback signal that are respectively output by the first and second reference channel, to obtain a third and fourth signal vector in response to the second port transmitting the first signal. The first, second, third, and fourth signal vector are useable to calibrate a deviation between the first and the second measured channel.

19 Claims, 18 Drawing Sheets

(51) Int. Cl.
*H04W 24/10* (2009.01)
*H04L 5/00* (2006.01)

(56) References Cited

U.S. PATENT DOCUMENTS

| | | |
|---|---|---|
| 2017/0257240 A1 | 9/2017 | Ma et al. |
| 2019/0028155 A1 | 1/2019 | Hofrichter et al. |
| 2019/0273568 A1* | 9/2019 | Zhang .................. H04B 1/123 |

FOREIGN PATENT DOCUMENTS

| | | | |
|---|---|---|---|
| CN | 105515686 A | 4/2016 | |
| CN | 106911365 A | 6/2017 | |
| CN | 107959533 A | 4/2018 | |
| CN | 109541330 A | 3/2019 | |
| WO | 2019039671 A1 | 2/2019 | |
| WO | 2019041868 A1 | 3/2019 | |
| WO | WO-2019127175 A1 * | 7/2019 | ........... H04B 1/0483 |

OTHER PUBLICATIONS

Li Yang et al, Fast Field Array Manifold Calibration for GNSS Antenna Arrays, 2018, 6 pages.
Chinese Office Action issued in corresponding Chinese Application No. 201980097954.X, dated May 31, 2022, pp. 1-7.
International Search Report issued in corresponding International Application No. PCT/CN2019/093895, dated Mar. 31, 2020, pp. 1-12.

* cited by examiner

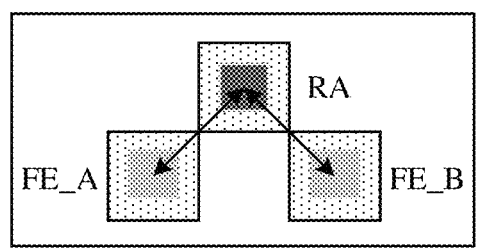
FIG. 1(1) --Prior Art--
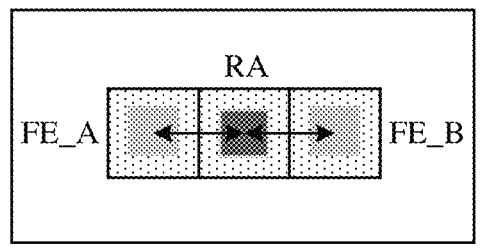
FIG. 1(2) --Prior Art--
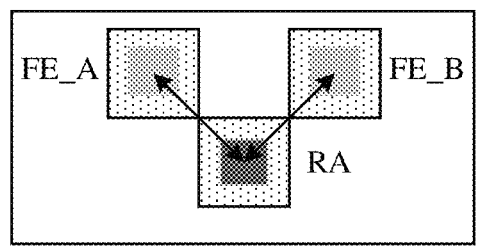
FIG. 1(3) --Prior Art--

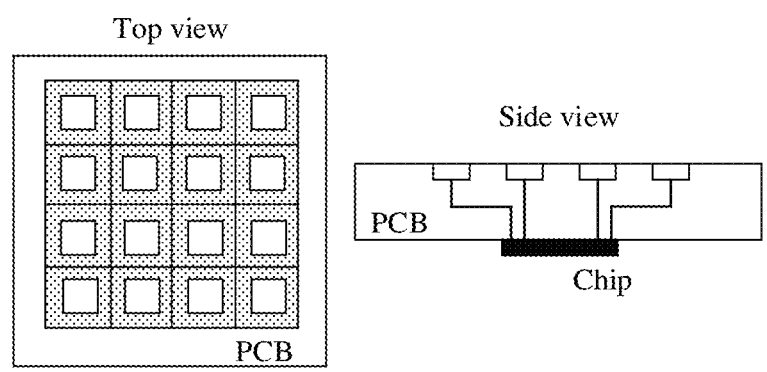
FIG. 2(a) AOB
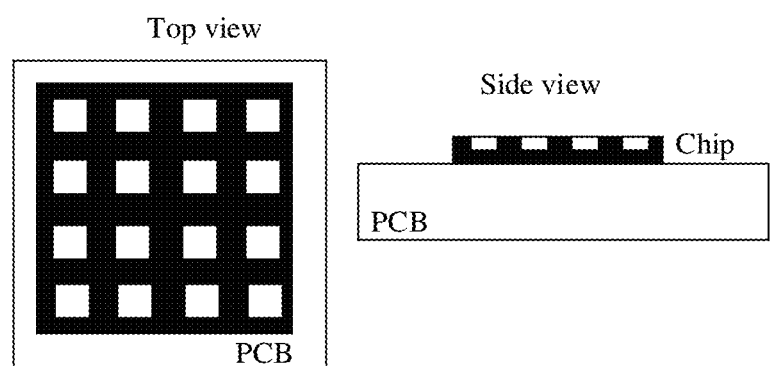
FIG. 2(b) AIP

TRANSMISSION CHANNEL CALIBRATION APPARATUS AND WIRELESS COMMUNICATIONS DEVICE

CROSS-REFERENCE TO RELATED APPLICATIONS

This application is a continuation of International Application No. PCT/CN2019/093895, filed on Jun. 28, 2019, the disclosure of which is hereby incorporated by reference in its entirety.

TECHNICAL FIELD

This application relates to the field of semiconductor technologies, and in particular, to a transmission channel calibration apparatus and a wireless communications device.

BACKGROUND

In a 5th generation (5G) system, lots of transmission channels are integrated into a radio frequency chip. Each transmission channel may correspond to one antenna (antenna, ANT), and is configured to receive/transmit a radio frequency signal. In an actual application, because consistency of parameters of all components in the transmission channel cannot be ensured, a deviation between transmission channels inevitably occurs. In this case, the transmission channel needs to be calibrated.

For example, a 5G communications system uses a millimeter wave as a carrier of a signal. An attenuation degree of millimeter wave propagation is much greater than that of a low-frequency electromagnetic wave. By introducing a phased array technology in the 5G communications system, directivity and equivalent isotropically radiated power (equivalent isotropically radiated power, EIRP) of a signal can be improved, so that a communication distance of the system and a system capacity are increased. A high-performance phased array requires transmission channels to be highly consistent (for example, in terms of amplitude and phases of signals on the transmission channels), and therefore the transmission channel needs to be calibrated.

In the conventional technology, to calibrate the transmission channel, the following manner may be used: For two to-be-calibrated measured channels, one reference channel may be selected, and an antenna corresponding to the reference channel is located in a center symmetrical position of antennas corresponding to the two measured channels. The measured channels are calibrated by transmitting and receiving reference signals through near-field coupling between the antennas. Assuming that RA is the antenna corresponding to the reference channel, and FE_A, and FE_B are the antennas corresponding to the measured channels, a relative position relationship between RA, FE_A, and FE_B may be shown in FIG. 1.

It can be learned from FIG. 1 that RA is in a center symmetrical position of FE_A and FE_B. In a specific application, a reference signal may be transmitted by using RA, then received signals of FE_A and FE_B are separately obtained, and receive channels corresponding to FE_A and FE_B are calibrated based on a deviation between the two received signals. Alternatively, reference signals are separately transmitted by using FE_A and FE_B, then received signals of RA are separately obtained, and transmit channels corresponding to FE_A and FE_B are calibrated based on a deviation between the two received signals. Because of the position relationship between RA, FE_A, and FE_B, signal attenuation in a spatial coupling path between RA and FE_A may be considered approximately equal to signal attenuation in a spatial coupling path between RA and FE_B. Therefore, using this manner to calibrate the measured channel has a relatively accurate calibration result.

However, the solution shown in FIG. 1 has a relatively strict requirement for a relative position relationship between an antenna corresponding to a reference channel and antennas corresponding to measured channels. For two measured channels (for example, two measured channels whose corresponding antennas are adjacent), it may be difficult to find a reference channel meeting the foregoing position relationship, and therefore the foregoing solution can hardly be executed. Therefore, the solution shown in FIG. 1 has low applicability, and can hardly calibrate all transmission channels in a system.

In conclusion, a calibration solution highly applicable to transmission channels is urgently required to calibrate a transmission channel in a system.

SUMMARY

Embodiments of this application provide a transmission channel calibration apparatus and a wireless communications device, to calibrate a transmission channel in a system.

According to a first aspect, an embodiment of this application provides a transmission channel calibration apparatus, including a first measured channel, a second measured channel, a first reference channel, a second reference channel, and a vector detection unit. The first measured channel and the second measured channel are symmetrically arranged, and the first reference channel and the second reference channel are symmetrically arranged. The vector detection unit is configured to: when the first measured channel transmits a first signal, separately perform detection based on a first feedback signal and a second feedback signal that are respectively output by the first reference channel and the second reference channel, to obtain a first signal vector and a second signal vector; and when the second measured channel transmits the first signal, separately perform detection based on a third feedback signal and a fourth feedback signal that are respectively output by the first reference channel and the second reference channel, to obtain a third signal vector and a fourth signal vector. The first signal vector, the second signal vector, the third signal vector, and the fourth signal vector are used to calibrate a deviation between the first measured channel and the second measured channel.

The first signal transmitted by the first measured channel is transmitted to the first reference channel by using a first spatial coupling path, the first signal transmitted by the second measured channel is transmitted to the second reference channel by using a second spatial coupling path, the first signal transmitted by the second measured channel is transmitted to the first reference channel by using a third spatial coupling path, and the first signal transmitted by the first measured channel is transmitted to the second reference channel by using a fourth spatial coupling path.

In the apparatus, a transmission channel (for example, the first measured channel, the second measured channel, the first reference channel, or the second reference channel) may include a plurality of components such as a phase shifter, a power amplifier, a low noise amplifier, and a filter. Therefore, a position of the transmission channel in the apparatus cannot be simply defined as a point. In the apparatus provided in the first aspect, the position of the transmission channel may be understood as a position of an antenna corresponding to the transmission channel.

That the first measured channel and the second measured channel are symmetrically arranged and the first reference channel and the second reference channel are symmetrically arranged may be understood as follows: A first antenna corresponding to the first measured channel and a second antenna corresponding to the second measured channel are symmetrically arranged with respect to an axis of a PCB (or a chip), and a third antenna corresponding to the first reference channel and a fourth antenna corresponding to the second reference channel are symmetrically arranged with respect to the same axis of the PCB (or the chip).

It should be understood that the foregoing symmetrical arrangement may be strict symmetrical arrangement or approximate symmetrical arrangement. If the first measured channel and the second measured channel are approximately symmetrically arranged, and the first reference channel and the second reference channel are approximately symmetrically arranged, the first measured channel and the second measured channel may also be calibrated by using the solution provided in the first aspect, and a calibration effect of the solution may be poorer than a calibration effect in a case of strict symmetrical arrangement, but the problem of low applicability of the existing calibration solution provided in the background can also be resolved.

According to the foregoing solution, the deviation between the first measured channel and the second measured channel may be calibrated. Because the first measured channel and the second measured channel are symmetrically arranged, and the first reference channel and the second reference channel are symmetrically arranged, a length of the first spatial coupling path between the first antenna and the third antenna is approximately equal to that of the second spatial coupling path between the second antenna and the fourth antenna, and a length of the third spatial coupling path between the second antenna and the third antenna is approximately equal to that of the fourth spatial coupling path between the first antenna and the fourth antenna. Attenuation and loss of the first signal in the first spatial coupling path may be considered approximately equal to attenuation and loss of the first signal in the second spatial coupling path. Similarly, attenuation and loss of the first signal in the third spatial coupling path may be considered approximately equal to attenuation and loss of the first signal in the third spatial coupling path. Therefore, when the signal vector obtained by the vector detection unit through detection is processed, a sum of the first signal vector and the second signal vector is calculated, and then a difference between the sum and a sum of the third signal vector and the fourth signal vector is calculated to offset an error of the first signal in the spatial coupling paths, so that a deviation correction value between the first measured channel and the second measured channel is accurately determined.

In addition, the first reference channel and the second reference channel that meet the foregoing position relationship can be found for the first measured channel and the second measured channel at any position. For example, for two measured channels with adjacent physical positions, a first reference channel and a second reference channel that are symmetrically arranged can also be found to eliminate a deviation in spatial coupling paths by using a symmetrical structure between antennas, thereby improving calibration accuracy of the apparatus. Compared with the conventional technology, the solution provided in this embodiment of this application can calibrate the first measured channel and the second measured channel at any position, to implement calibration of all transmission channels in a system. This solution has relatively high adaptability.

In a possible design, a length of the first spatial coupling path is equal to that of the second spatial coupling path, and a length of the third spatial coupling path is equal to that of the fourth spatial coupling path.

In a possible design, a processing unit is configured to calibrate the deviation between the first measured channel and the second measured channel based on the first signal vector, the second signal vector, the third signal vector, and the fourth signal vector.

The processing unit and the vector detection unit may be integrated into a same semiconductor chip, or may be integrated into different semiconductor chips.

Specifically, the processing unit may calibrate the deviation between the first measured channel and the second measured channel based on the first signal vector, the second signal vector, the third signal vector, and the fourth signal vector in the following manner: The processing unit determines a first deviation correction value between the first measured channel and the second measured channel based on the first signal vector, the second signal vector, the third signal vector, and the fourth signal vector, and calibrates the deviation between the first measured channel and the second measured channel based on the first deviation correction value.

The first deviation correction value may include one or both of a first amplitude correction value and a first phase correction value.

According to the foregoing solution, an amplitude deviation and a phase deviation between the first measured channel and the second measured channel may be calibrated.

In a possible design, the vector detection unit includes a first orthogonal receiver; and the first reference channel and the second reference channel are combined by using a first combiner, and the first orthogonal receiver is connected to the first combiner by using a first coupler. When the first measured channel transmits the first signal, the first orthogonal receiver is configured to perform frequency mixing processing on the first signal and the first feedback signal and on the first signal and the second feedback signal to obtain the first signal vector and the second signal vector. When the second measured channel transmits the first signal, the first orthogonal receiver is configured to perform frequency mixing processing on the first signal and the third feedback signal and on the first signal and the fourth feedback signal to obtain the third signal vector and the fourth signal vector.

According to the foregoing solution, the first orthogonal receiver may perform frequency mixing processing to obtain the signal vector. Certainly, in an actual application, the vector detection unit may be implemented by another component such as a phase detector.

In a possible design, the apparatus provided in the first aspect may further include a first splitter, and the first splitter is separately connected to the first measured channel, the second measured channel, and the first orthogonal receiver to separately input the first signal into the first measured channel, the second measured channel, and the first orthogonal receiver.

According to the foregoing solution, the first splitter may provide the first signal to the first measured channel, the second measured channel, and the first orthogonal receiver.

In the first possible design, the apparatus provided in the first aspect is an apparatus into which a radio frequency signal is input, and the first signal is a radio frequency signal, where the first signal is a radio frequency signal that comes from the outside; or the apparatus further includes a signal generator connected to the first splitter, the signal generator is configured to generate a radio frequency signal, and the radio frequency signal includes the first signal.

In the second possible design, the apparatus provided in the first aspect is an apparatus into which an intermediate frequency signal is input, the apparatus further includes a mixer connected to the first splitter, and the mixer is configured to perform frequency mixing processing on the intermediate frequency signal and a correction signal to obtain the first signal, where the correction signal comes from the outside, or the apparatus further includes a signal generator, and the signal generator is configured to generate the correction signal.

In the third possible design, the apparatus provided in the first aspect is an apparatus into which a baseband signal is input, where the first signal comes from the outside; or the apparatus further includes a signal generator connected to the first splitter, and the signal generator is configured to generate the first signal.

According to the foregoing three solutions, the first measured channel and the second measured channel may be calibrated on a premise that a radio frequency signal, an intermediate frequency signal, and a baseband signal are input.

The foregoing describes an implementation in which the transmission channel calibration apparatus calibrates transmit channels of the first measured channel and the second measured channel. In this application, the transmission channel calibration apparatus can further calibrate receive channels of the first measured channel and the second measured channel.

In a possible design, the vector detection unit is further configured to: when the first reference channel transmits a second signal, separately perform detection based on a fifth feedback signal and a sixth feedback signal that are respectively received by the first measured channel and the second measured channel, to obtain a fifth signal vector and a sixth signal vector; and when the second reference channel transmits the second signal, separately perform detection based on a seventh feedback signal and an eighth feedback signal that are respectively output by the first measured channel and the second measured channel, to obtain a seventh signal vector and an eighth signal vector, where the fifth signal vector, the sixth signal vector, the seventh signal vector, and the eighth signal vector are used to calibrate the deviation between the first measured channel and the second measured channel.

According to the foregoing solution, the reference channel may transmit the second signal, and the measured channel may receive the second signal, so that receive channels of the first measured channel and the second measured channel are calibrated based on the feedback signals output by the first measured channel and the second measured channel. Specifically, because of the foregoing position relationship between the two measured channels and the two reference channels, attenuation and loss of the second signal in the first spatial coupling path may be considered approximately equal to attenuation and loss of the second signal in the second spatial coupling path. Similarly, attenuation and loss of the second signal in the third spatial coupling path may be considered approximately equal to attenuation and loss of the second signal in the fourth spatial coupling path. Therefore, when the signal vector obtained by the vector detection unit through detection is processed, a sum of the fifth signal vector and the sixth signal vector is calculated, and then a difference between the sum and a sum of the seventh signal vector and the eighth signal vector is calculated to offset an error of the second signal in the spatial coupling paths, so that a deviation correction value between the first measured channel and the second measured channel is accurately determined.

In a possible design, the processing unit is further configured to calibrate the deviation between the first measured channel and the second measured channel based on the fifth signal vector, the sixth signal vector, the seventh signal vector, and the eighth signal vector.

Specifically, the processing unit may calibrate the deviation between the first measured channel and the second measured channel based on the fifth signal vector, the sixth signal vector, the seventh signal vector, and the eighth signal vector in the following manner. The processing unit determines a second deviation correction value between the first measured channel and the second measured channel based on the fifth signal vector, the sixth signal vector, the seventh signal vector, and the eighth signal vector, and calibrates the deviation between the first measured channel and the second measured channel based on the second deviation correction value.

The second deviation correction value may include one or both of a second amplitude correction value and a second phase correction value.

According to the foregoing solution, an amplitude deviation and a phase deviation between the first measured channel and the second measured channel may be calibrated.

In a possible design, the vector detection unit includes a second orthogonal receiver; and the first measured channel and the second measured channel are combined by using a second combiner, and the second orthogonal receiver is connected to the second combiner by using a second coupler. When the first reference channel transmits the second signal, the second orthogonal receiver is configured to perform frequency mixing processing on the second signal and the fifth feedback signal and on the second signal and the sixth feedback signal to obtain the fifth signal vector and the sixth signal vector. When the second reference channel transmits the second signal, the second orthogonal receiver is configured to perform frequency mixing processing on the second signal and the seventh feedback signal and on the second signal and the eighth feedback signal to obtain the seventh signal vector and the eighth signal vector.

According to the foregoing solution, the second orthogonal receiver may perform frequency mixing processing to obtain the signal vector. Certainly, in an actual application, the vector detection unit may be implemented by another component such as a phase detector.

It should be understood that the second orthogonal receiver and the first orthogonal receiver may be a same orthogonal receiver, in other words, the first feedback signal to the eighth feedback signal may be processed by using one orthogonal receiver.

In a possible design, the apparatus provided in the first aspect may further include a second splitter, and the second splitter is separately connected to the first reference channel, the second reference channel, and the second orthogonal receiver to separately input the second signal into the first reference channel, the second reference channel, and the second orthogonal receiver.

According to the foregoing solution, the second splitter may provide the first signal to the first reference channel, the second reference channel, and the second orthogonal receiver.

In a possible design, the first measured channel and the second measured channel are integrated into a same semiconductor chip, or the first measured channel and the second measured channel are integrated into different semiconductor chips.

According to a second aspect, a wireless communications device is provided. The wireless communications device includes the apparatus provided in any one of the first aspect and the possible designs of the first aspect. Optionally, the device may be a base station, or may be a terminal.

BRIEF DESCRIPTION OF DRAWINGS

FIG. 1 (1) and FIG. 1 (2) and FIG. 1 (3) are a schematic diagram of a structure of a transmission channel calibration solution according to the conventional technology;

FIG. 2 (a) and FIG. 2 (b) are a schematic diagram of a structure of a combination form of an antenna and a chip according to an embodiment of this application;

DESCRIPTION OF EMBODIMENTS

Figure 3:
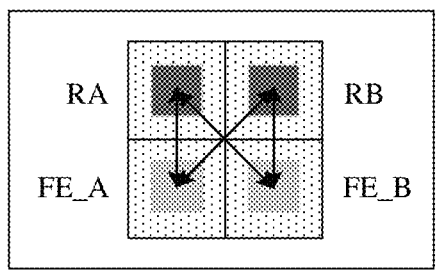
FIG. 3 (1) and FIG. 3 (2) and FIG. 3 (3) and FIG. 3 (4) and FIG. 3 (5) and FIG. 3 (6) are a schematic diagram of the first antenna distribution according to an embodiment of this application.
Figure 3:
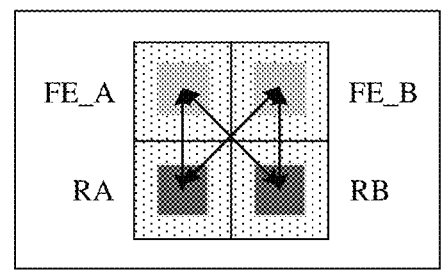
Figure 3:
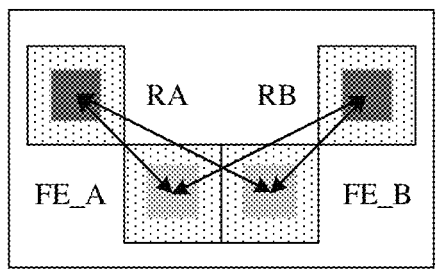
Figure 3:
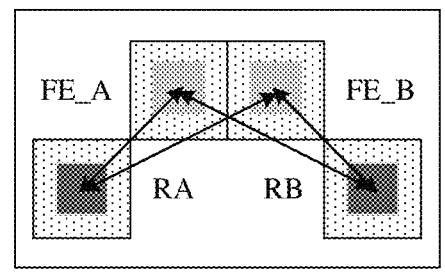
Figure 3:
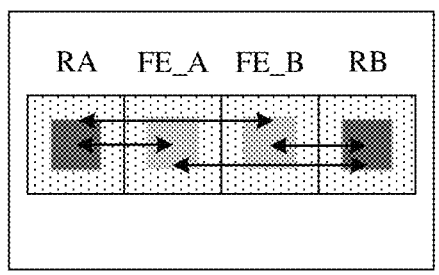
Figure 3:
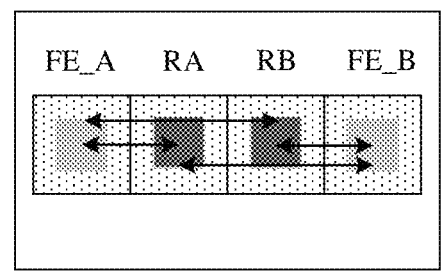

As described in the background, lots of transmission channels are integrated into a radio frequency chip. Each transmission channel may correspond to one antenna (antenna, ANT), and is configured to receive/transmit a radio frequency signal. One transmission channel and one antenna unit may constitute a channel used for signal reception or transmission in a device. In the embodiments of this application, a transmission channel and a channel including a transmission channel and an antenna unit each may be referred to as a transmission channel Transmission channels may be further classified into measured channels and reference channels based on different functions. The measured channel is a to-be-calibrated transmission channel, and the reference channel is a transmission channel used for calibration in cooperation with the measured channel.

Specifically, each transmission channel may include a plurality of components. For example, a transmission channel used for signal transmission may include a phase shifter (PS) and a power amplifier (power amplifier, PA), and a transmission channel used for signal reception may include a phase shifter (PS) and a low noise amplifier (low noise amplifier, LNA). In addition, the transmission channel may further include other components such as a filter, an antenna switch, a mixer (MIX), an analog-to-digital converter (analog-to-digital converter, ADC), a digital-to-analog converter (digital-to-analog converter, DAC), and a modulator (MOD). A type of the component included in the transmission channel is not specifically limited in the embodiments of this application.

In an actual application, a chip and an antenna may use different combination forms.

As shown in FIG. 2, assuming that a radio frequency chip includes 4*4 transmission channels, corresponding antennas are an antenna array of 4*4. During print design, the antennas and the chip may have two combination forms. To be specific, the antenna array is located on a system board (antenna on PCB, AOB), and the antenna array is located in a package of the chip (antenna in package, AIP). As shown in an example of FIG. 2(a), AOB means that the antennas are located in a printed circuit board (print circuit board, PCB), and the antennas and the chip may be separately located on two sides of the PCB (in other words, the antennas are printed on one side of the PCB and the chip is attached to the other side of the PCB), or may be located on a same side of the PCB (in other words, the antennas are printed on one side of the PCB and the chip is attached to the same side). FIG. 2 describes an example in which the antennas and the chip are located on different sides. As shown in an example of FIG. 2(b), AIP means that the antennas are located in a package (package) of the chip, the antennas and the chip are packaged together, the antennas may be located at the top of the package of the chip, and the chip is attached to the PCB.

Regardless of a combination form of the antenna and the chip, an application scenario of calibrating a transmission channel is involved. In the conventional technology, a transmission channel is usually calibrated in a manner shown in FIG. 1. However, because the solution shown in FIG. 1 has a strict requirement for a position relationship between a measured channel and a reference channel, the solution has low applicability.

To resolve the problem of low applicability of the solution shown in FIG. 1, in the embodiments of this application, two reference channels, namely, a first reference channel and a second reference channel, are configured for a first measured channel and a second measured channel that are to be calibrated. The first measured channel and the second measured channel are symmetrically arranged, and the first reference channel and the second reference channel are symmetrically arranged.

That the first measured channel and the second measured channel are symmetrically arranged and the first reference channel and the second reference channel are symmetrically arranged may be understood as follows: It is assumed that an antenna corresponding to the first measured channel is referred to as a first antenna, an antenna corresponding to the second measured channel is referred to as a second antenna, an antenna corresponding to the first reference channel is referred to as a third antenna, and an antenna corresponding to the second reference channel is referred to as a fourth antenna. In the AOB combination form, the first antenna and the second antenna are symmetrically arranged on a PCB with respect to an axis of the PCB, and the third antenna and the fourth antenna are also symmetrically arranged on the PCB with respect to the same axis. In the AIP combination form, the first antenna and the second antenna are symmetrically arranged on a chip with respect to an axis of the chip, and the third antenna and the fourth antenna are also symmetrically arranged on the chip with respect to the same axis.

It should be understood that the foregoing symmetrical arrangement manner is only an example in the embodiments of this application. In an actual application, the symmetrical arrangement of the transmission channels may mean "strictly symmetrical" or "approximately symmetrical". If the first measured channel and the second measured channel are approximately symmetrically arranged, and the first reference channel and the second reference channel are approximately symmetrically arranged, the first measured channel and the second measured channel may also be calibrated by using the solution provided in the embodiments of this application, and a calibration effect of the solution may be poorer than a calibration effect in a case of strict symmetrical arrangement, but the problem of low applicability of the existing calibration solution provided in the background can also be resolved.

Through the symmetrical arrangement of the antennas, the following may be implemented: A length of a first spatial coupling path between the first antenna and the third antenna is equal to that of a second spatial coupling path between the second antenna and the fourth antenna, and a length of a third spatial coupling path between the second antenna and the third antenna is equal to that of a fourth spatial coupling path between the first antenna and the fourth antenna. In other words, if the chip and the antenna use the AOB combination form, on the PCB, a distance between the first antenna and the third antenna is equal to a distance between the second antenna and the fourth antenna, and a distance between the second antenna and the third antenna is equal to a distance between the first antenna and the fourth antenna. If the chip and the antenna use the AIP combination form, on the chip, a distance between the first antenna and the third antenna is equal to a distance between the second antenna and the fourth antenna, and a distance between the second antenna and the third antenna is equal to a distance between the first antenna and the fourth antenna.

For example, taking the AOB combination form as an example, a position relationship between the first antenna, the second antenna, the third antenna, and the fourth antenna on the PCB may be shown in FIG. 3. FE_A represents the first antenna, FE_B represents the second antenna, RA represents the third antenna, and RB represents the fourth antenna.

It can be learned that, for a first measured channel and a second measured channel at any position, two antennas corresponding to two reference channels can be always found based on the foregoing symmetrical position relationship between antennas, and then a first reference channel and a second reference channel corresponding to the two antennas are determined. For example, for two measured channels with adjacent physical positions, a first reference channel and a second reference channel may be determined in manners in examples of FIG. 3(1), FIG. 3(2), FIG. 3(3), and FIG. 3(5), and then a first measured channel and a second measured channel are calibrated based on an antenna air loopback signal.

Specifically, in the embodiments of this application, the first measured channel and the second measured channel may be two transmission channels with adjacent physical positions (in other words, the first antenna corresponding to the first measured channel and the second antenna corresponding to the second measured channel are two antennas with adjacent positions in an antenna array), or may be two transmission channels with relatively distant physical positions (in other words, the first antenna corresponding to the first measured channel and the second antenna corresponding to the second measured channel are not two antennas with adjacent positions in an antenna array). The first measured channel and the second measured channel may be channels in a same semiconductor chip (for example, may be transmission channels in a same radio frequency chip), or may be channels in different semiconductor chips (for example, may be transmission channels in two radio frequency chips). If the first measured channel and the second measured channel are channels in a same semiconductor chip, the calibration apparatus provided in this application can be used to implement calibration of measured channels within a chip; or if the first measured channel and the second measured channel are channels in different semiconductor chips, the calibration apparatus provided in this application can implement calibration of measured channels between chips.

Figure 4:
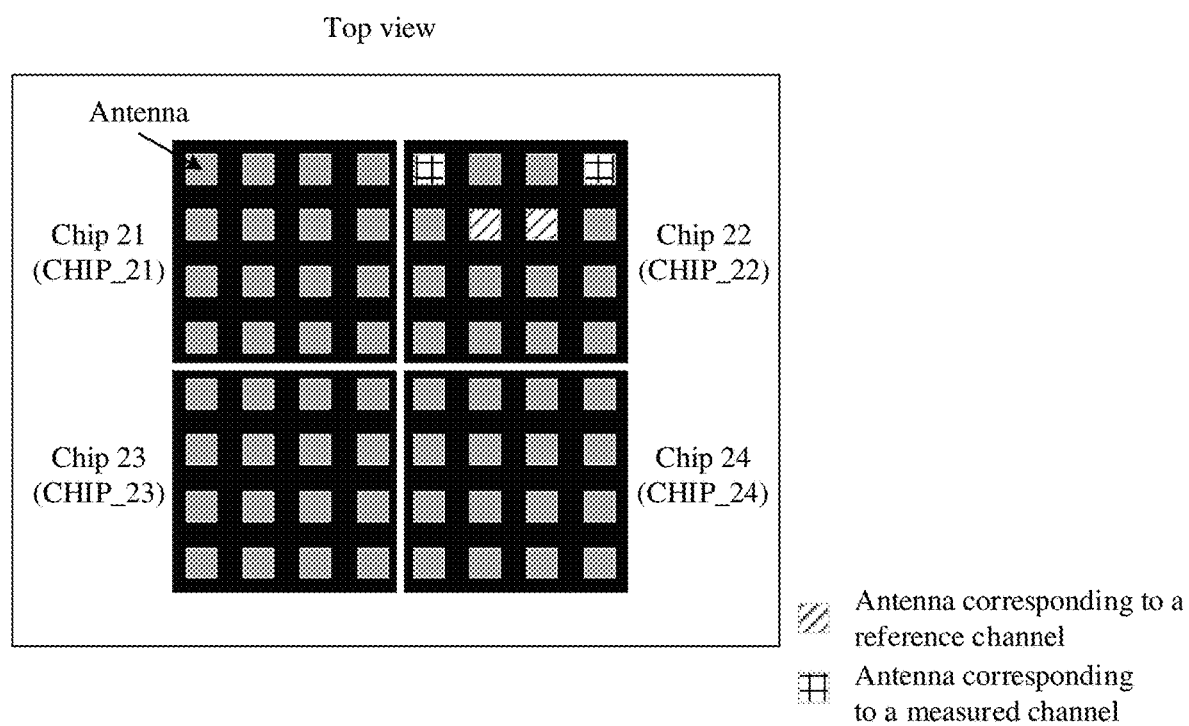
FIG. 4 is a schematic diagram of the second antenna distribution according to an embodiment of this application.

For example, if calibration of measured channels within a chip is performed, a position relationship between reference channels and measured channels may be shown in FIG. 4. Two measured channels are transmission channels in a same radio frequency chip. It can be learned that the solution shown in FIG. 4 can calibrate two measured channels within a chip 22 (CHIP_22).

Figure 5:
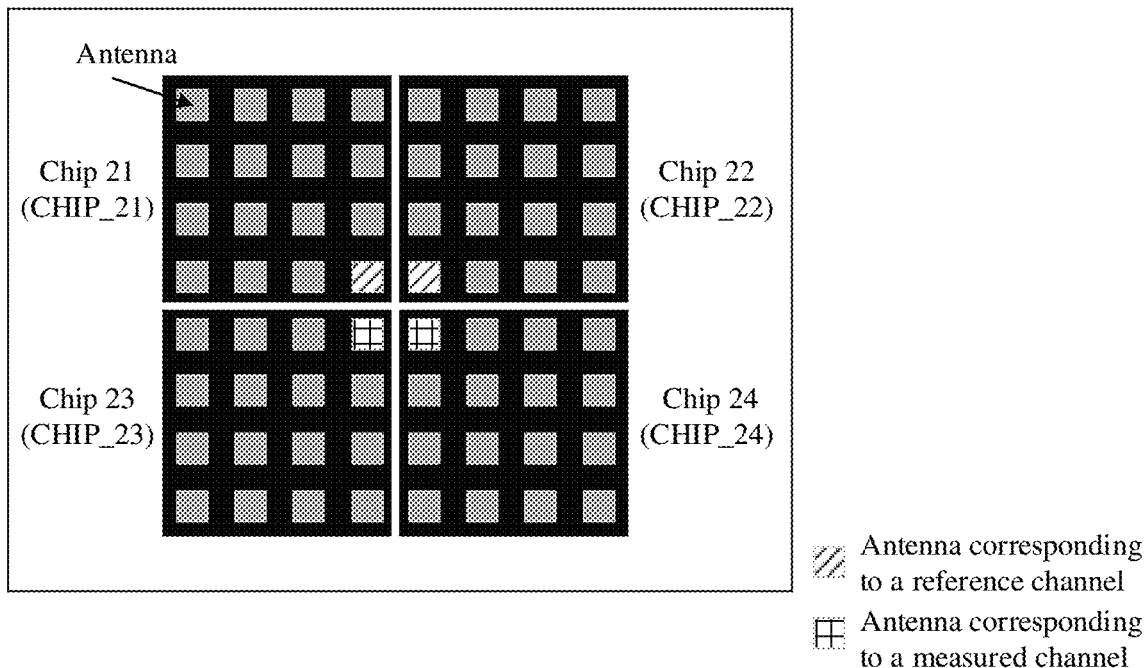
FIG. 5 is a schematic diagram of the third antenna distribution according to an embodiment of this application.

For example, if calibration of measured channels between chips is performed, a position relationship between reference channels and measured channels may be shown in FIG. 5. Two measured channels are transmission channels in different radio frequency chips. It can be learned that the solution shown in FIG. 5 can calibrate measured channels between a chip 23 (CHIP_23) and a chip 24 (CHIP_24).

It should be understood that regardless of whether the first measured channel and the second measured channel are transmission channels in a same semiconductor chip or transmission channels in different semiconductor chips, semiconductor chips to which the first reference channel and the second reference channel belong are not limited. For example, if the first measured channel and the second measured channel are transmission channels in a chip 1, the first reference channel and the second reference channel may be transmission channels in the chip 1, or may be transmission channels in a chip 2, or the first reference channel is a transmission channel in a chip 2, and the second reference channel is a transmission channel in a chip 3. For another example, if the first measured channel is a transmission channel in a chip 1, and the second measured channel is a transmission channel in a chip 2, the first reference channel and the second reference channel may be transmission channels in the chip 1, or may be transmission channels in the chip 2, or the first reference channel is a transmission channel in the chip 1, and the second reference channel is a transmission channel in the chip 2, or the first reference channel is a transmission channel in a chip 3, and the second reference channel is a transmission channel in a chip 4.

It should be noted that, in the embodiments of this application, the measured channel and the reference channel may be used to transmit signals, and may also be used to receive signals. In a specific implementation solution, if the measured channel is used to transmit a signal, and the reference channel is used to receive a signal, a transmit channel of the measured channel may be calibrated; or if the reference channel is used to transmit a signal, and the measured channel is used to receive a signal, a receive channel of the measured channel may be calibrated.

When the first reference channel, the second reference channel, the first measured channel, and the second measured channel are configured by using the foregoing position relationship, a symmetrical structure between antennas may be used to eliminate a deviation in spatial coupling paths, so that accuracy of the calibration apparatus is improved.

With reference to the accompanying drawings, the following describes in detail the transmission channel calibration solution provided in the embodiments of this application.

Figure 6:
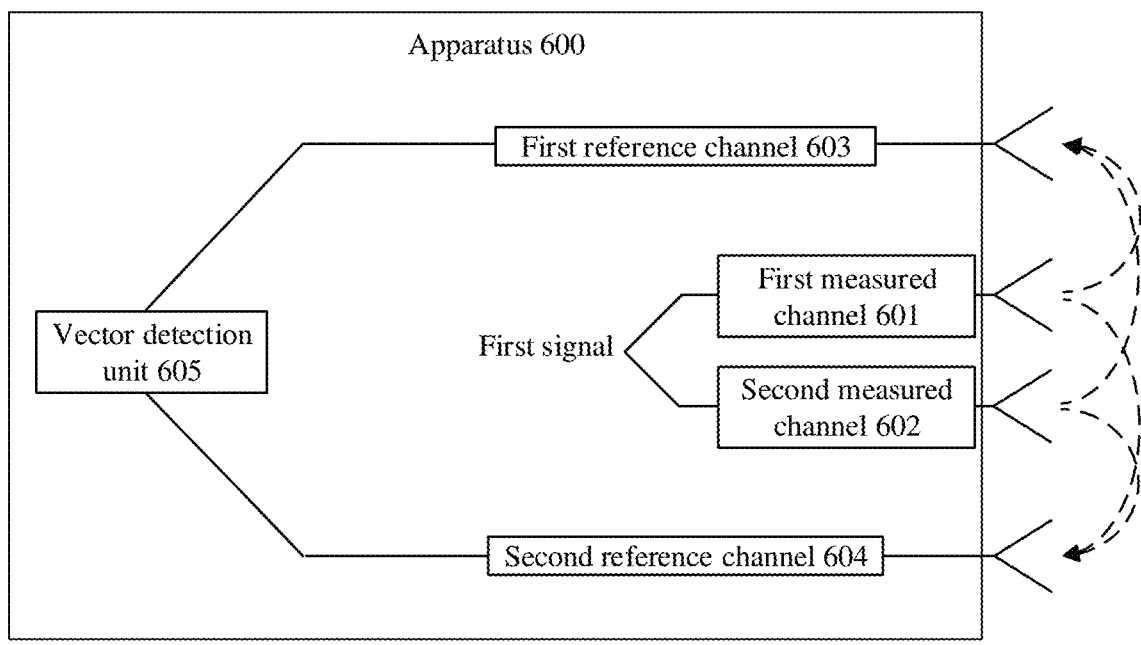
FIG. 6 is a schematic diagram of a structure of a transmission channel calibration apparatus according to an embodiment of this application.

FIG. 6 is a schematic diagram of a structure of a transmission channel calibration apparatus according to an embodiment of this application. A transmission channel calibration apparatus 600 (referred to as an apparatus 600 below) includes a first measured channel 601, a second measured channel 602, a first reference channel 603, a second reference channel 604, and a vector detection unit 605.

The vector detection unit 605 is configured to: when the first measured channel 601 transmits a first signal, separately perform detection based on a first feedback signal and a second feedback signal that are respectively output by the first reference channel 603 and the second reference channel 604, to obtain a first signal vector and a second signal vector; and when the second measured channel 602 transmits the first signal, separately perform detection based on a third feedback signal and a fourth feedback signal that are respectively output by the first reference channel 603 and the second reference channel 604, to obtain a third signal vector and a fourth signal vector.

The first signal vector, the second signal vector, the third signal vector, and the fourth signal vector are used to calibrate a deviation between the first measured channel 601 and the second measured channel 602.

The transmission channel calibration apparatus 600 may calibrate the first measured channel 601 and the second measured channel 602 by using the two reference channels: the first reference channel 603 and the second reference channel 604. The first measured channel 601 and the second measured channel 602 are symmetrically arranged, and the first reference channel 603 and the second reference channel 604 are symmetrically arranged.

Specifically, for specific meanings of the symmetrical arrangement of the first measured channel 601 and the second measured channel 602 and the symmetrical arrangement of the first reference channel 603 and the second reference channel 604, refer to the foregoing explanations. Details are not described herein again.

It is assumed that the first signal transmitted by the first measured channel 601 is transmitted to the first reference channel 603 by using a first spatial coupling path, the first signal transmitted by the second measured channel 602 is transmitted to the second reference channel 604 by using a second spatial coupling path, the first signal transmitted by the second measured channel 602 is transmitted to the first reference channel 603 by using a third spatial coupling path, and the first signal transmitted by the first measured channel 601 is transmitted to the second reference channel 604 by using a fourth spatial coupling path. It may be determined, based on a position relationship between the plurality of transmission channels (the first measured channel 601, the second measured channel 602, the first reference channel 603, and the second reference channel 604), that a length of the first spatial coupling path is equal to that of the second spatial coupling path, and a length of the third spatial coupling path is equal to that of the fourth spatial coupling path.

Figure 7:
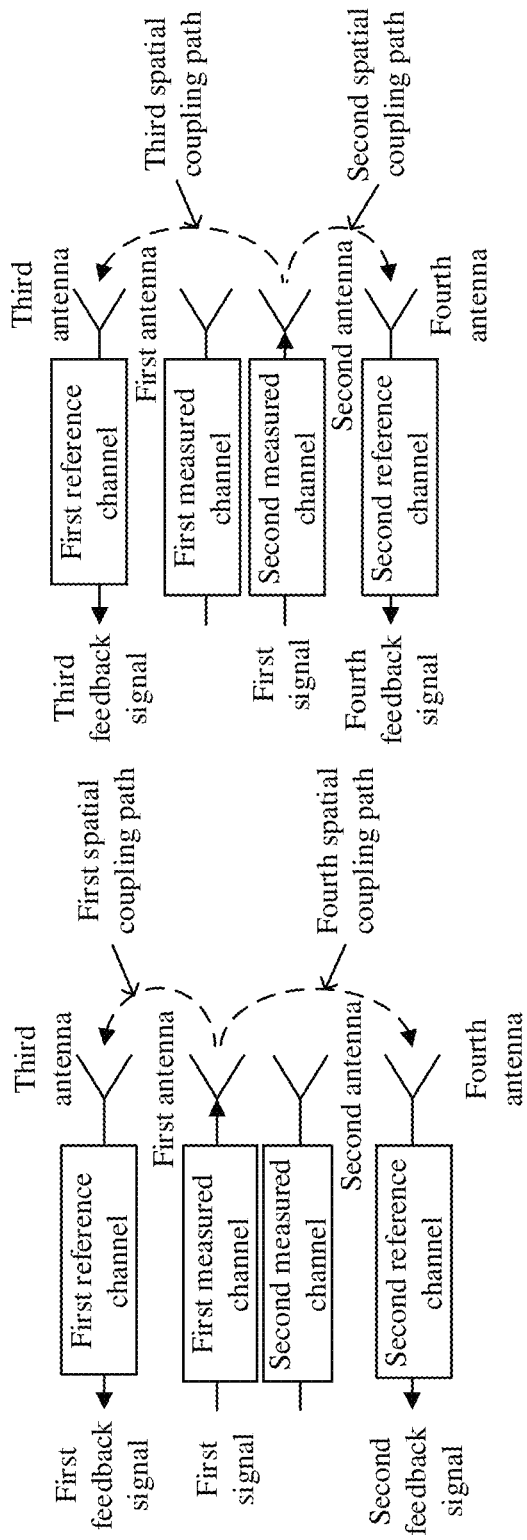
FIG. 7 is a schematic diagram of signal transmission performed by a plurality of transmission channels according to an embodiment of this application.

When the first measured channel 601 and the second measured channel 602 transmit the first signal, the first reference channel 603 and the second reference channel 604 may receive the air loopback signal by using different spatial coupling paths. Specifically, as shown in FIG. 7, the first signal transmitted by the first measured channel 601 is transmitted to the first reference channel 603 and the second reference channel 604 respectively by using the first spatial coupling path and the fourth spatial coupling path, and the first reference channel 603 and the second reference channel 604 respectively output the first feedback signal and the second feedback signal. The first signal transmitted by the second measured channel 602 is transmitted to the first reference channel 603 and the second reference channel 604 respectively by using the third spatial coupling path and the second spatial coupling path, and the first reference channel 603 and the second reference channel 604 respectively output the third feedback signal and the fourth feedback signal.

It can be learned from FIG. 7 that, because the foregoing position relationship exists between the plurality of transmission channels, attenuation and loss of the first signal in the first spatial coupling path may be considered approximately equal to attenuation and loss of the first signal in the second spatial coupling path. Similarly, attenuation and loss of the first signal in the third spatial coupling path may be considered approximately equal to attenuation and loss of the first signal in the fourth spatial coupling path. Therefore, a difference between a sum of the first feedback signal and the second feedback signal and a sum of the third feedback signal and the fourth feedback signal is calculated to offset an error of the first signal in the spatial coupling paths, and the difference can reflect the signal deviation between the first measured channel 601 and the second measured channel 602.

It should be understood that the foregoing descriptions of the process of transmitting the first signal are merely for illustrating an input and an output relationship of the signal, and do not indicate that the first measured channel 601 and the second measured channel 602 need to transmit the first signal at different moments. In other words, the first measured channel 601 and the second measured channel 602 may simultaneously transmit the first signal, or may separately transmit the first signal at different moments.

Figure 8:
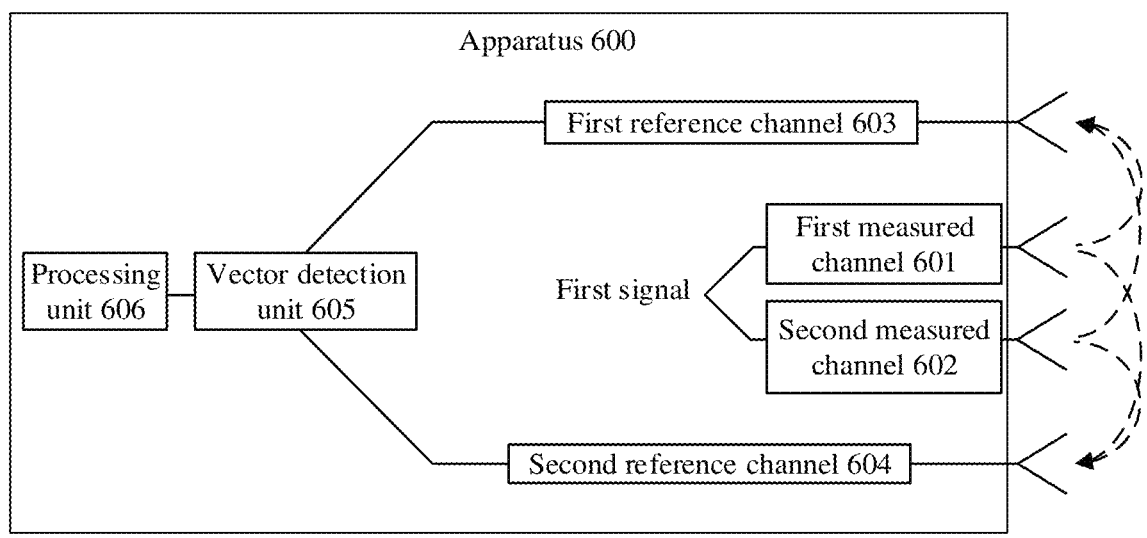
FIG. 8 is a schematic diagram of another type of signal transmission performed by a plurality of transmission channels according to an embodiment of this application.

In addition, the apparatus 600 may further include a processing unit 606, as shown in FIG. 8. The processing unit 606 is configured to calibrate the deviation between the first measured channel 601 and the second measured channel 602 based on the first signal vector, the second signal vector, the third signal vector, and the fourth signal vector.

The vector detection unit 605 and the processing unit 606 may calibrate the deviation between the first measured channel 601 and the second measured channel 602 used as transmit channels. The following describes specific processing processes of the vector detection unit 605 and the processing unit 606 in a process of calibrating a transmit channel.

I. Processing Process of the Vector Detection Unit 605

The specific processing process of the vector detection unit 605 may be summarized as follows: The vector detection unit 605 separately performs detection on the first feedback signal, the second feedback signal, the third feedback signal, and the fourth feedback signal to obtain the first signal vector, the second signal vector, the third signal vector, and the fourth signal vector.

Two points need to be described for the processing process of the vector detection unit 605.

1. The vector detection unit 605 may perform one or more times of detection on each feedback signal. The vector detection unit 605 obtains one signal vector when performing one time of detection on each feedback signal, or obtains a plurality of signal vectors when performing a plurality of times of detection on each feedback signal. The following embodiment describes an example in which the vector detection unit 605 performs one time of detection on the feedback signal.

2. In specific implementation, a specific process of detecting the feedback signal by the vector detection unit 605 may be that the vector detection unit 605 performs frequency mixing processing on the first signal and the feedback signal to obtain the signal vector. For example, the vector detection unit 605 performs frequency mixing processing on the first signal and the first feedback signal to obtain the first signal vector, and the vector detection unit 605 performs frequency mixing processing on the first signal and the second feedback signal to obtain the second signal vector.

Specifically, the signal vector obtained by the vector detection unit 605 through detection may include one or both of an amplitude vector and a phase vector. For example, the first signal vector may include a first amplitude vector and a first phase vector, the first amplitude vector is used to reflect amplitude information of the first feedback signal, and the first phase vector is used to reflect phase information of the first feedback signal. For example, the third signal vector may include a third amplitude vector and a third phase vector, the third amplitude vector is used to reflect amplitude information of the third feedback signal, and the third phase vector is used to reflect phase information of the third feedback signal.

II. Processing Process of the Processing Unit 606

The specific processing process of the processing unit 606 may be summarized as follows: The processing unit 606 calibrates the deviation between the first measured channel 601 and the second measured channel 602 based on the first signal vector, the second signal vector, the third signal vector, and the fourth signal vector.

Specifically, the processing unit may determine a first deviation correction value between the first measured channel 601 and the second measured channel 602 based on the signal vector obtained through detection. The first deviation correction value is used to calibrate the deviation between the first measured channel 601 and the second measured channel 602 (used as transmit channels).

Because the signal vector may include one or both of an amplitude vector and a phase vector, correspondingly, the first deviation correction value may include one or both of a first amplitude correction value and a first phase correction value. The first amplitude correction value is used to calibrate an amplitude deviation between the first measured channel 601 and the second measured channel 602, and the first phase correction value is used to calibrate a phase deviation between the first measured channel 601 and the second measured channel 602.

After an amplitude correction value and a phase correction value between the first measured channel 601 and the second measured channel 602 are determined, the first measured channel 601 or the second measured channel 602 may be compensated based on the amplitude correction value, to correct the amplitude deviation between the first measured channel 601 and the second measured channel 602; and/or the first measured channel 601 or the second measured channel 602 may be compensated based on the phase correction value, to correct the phase deviation between the first measured channel 601 and the second measured channel 602. For example, a phase shifter (phase shifter, PS) is disposed in the first measured channel 601 and/or the second measured channel 602, and the amplitude correction value and the phase correction value between the first measured channel 601 and the second measured channel 602 are set by using the PS.

Because the length of the first spatial coupling path between the first antenna and the third antenna is equal to that of the second spatial coupling path between the second antenna and the fourth antenna, and the length of the third spatial coupling path between the second antenna and the third antenna is equal to that of the fourth spatial coupling path between the first antenna and the fourth antenna, the sum of the first signal vector and the second signal vector is calculated, and then the difference between the sum and the sum of the third signal vector and the fourth signal vector is calculated to offset the error of the first signal in the spatial coupling paths. The processing unit 606 may determine the first deviation correction value between the first measured channel 601 and the second measured channel 602 based on the first signal vector, the second signal vector, the third signal vector, and the fourth signal vector.

The following describes the specific processing process of the processing unit 606 by using a specific example.

It is assumed that the first signal vector is $(A_1, \theta_1)$, the second signal vector is $(A_2, \theta_2)$, the third signal vector is $(A_3, \theta_3)$, and the fourth signal vector is $(A_4, \theta_4)$. The processing unit 606 may determine the first amplitude correction value $\Delta A_{12}$ between the first measured channel 601 and the second measured channel 602 based on four amplitude vectors $A_1$, $A_2$, $A_3$, and $A_4$, and determine the first phase correction value $\Delta A_{12}$ between the first measured channel 601 and the second measured channel 602 based on four phase vectors $\theta_1$, $\theta_2$, $\theta_3$, and $\theta_4$. For example, the processing unit 606 may determine $\Delta A_{12}$ based on the following Formula (1), and determine $\Delta \theta_{12}$ based on the following Formula (2):

$$\Delta A_{12} = \tfrac{1}{2}(A_1 + A_2 - A_3 - A_4) \tag{1}$$

$$\Delta \theta_{12} = \tfrac{1}{2}(\theta_1 + \theta_2 - \theta_3 - \theta_4) \tag{2}$$

The processing unit 606 may calibrate, based on $\Delta A_{13}$ and $\Delta\theta_{12}$, the deviation between the first measured channel 601 and the second measured channel 602 used as transmit channels.

Figure 9:
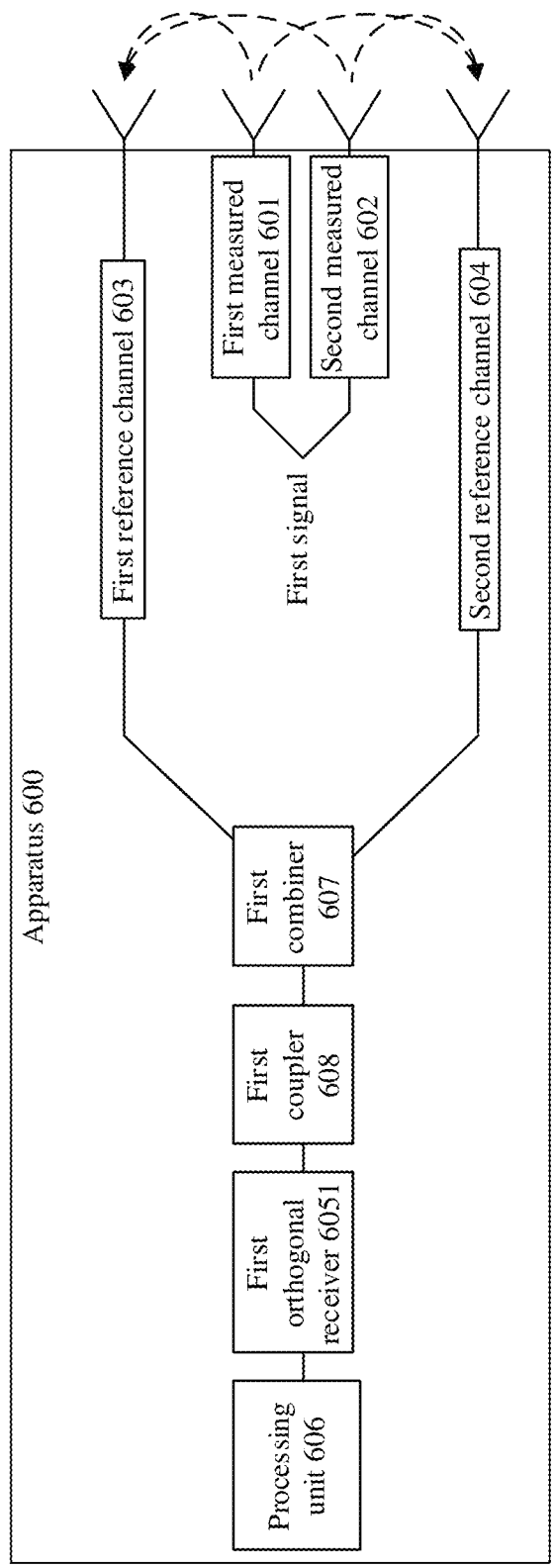
FIG. 9 is a schematic diagram of a structure of the first transmission channel calibration system according to an embodiment of this application.

In addition, the vector detection unit 605 may include a first orthogonal receiver 6051. As shown in FIG. 9, the first reference channel 603 and the second reference channel 604 are combined by using a first combiner 607, and the first orthogonal receiver 6051 is connected to the first combiner 607 by using a first coupler 608.

When the first measured channel 601 transmits the first signal, the first orthogonal receiver 6051 is configured to perform frequency mixing processing on the first signal and the first feedback signal and on the first signal and the second feedback signal to obtain the first signal vector and the second signal vector. When the second measured channel 602 transmits the first signal, the first orthogonal receiver 6051 is configured to perform frequency mixing processing on the first signal and the third feedback signal and on the first signal and the fourth feedback signal to obtain the third signal vector and the fourth signal vector.

Figure 10:
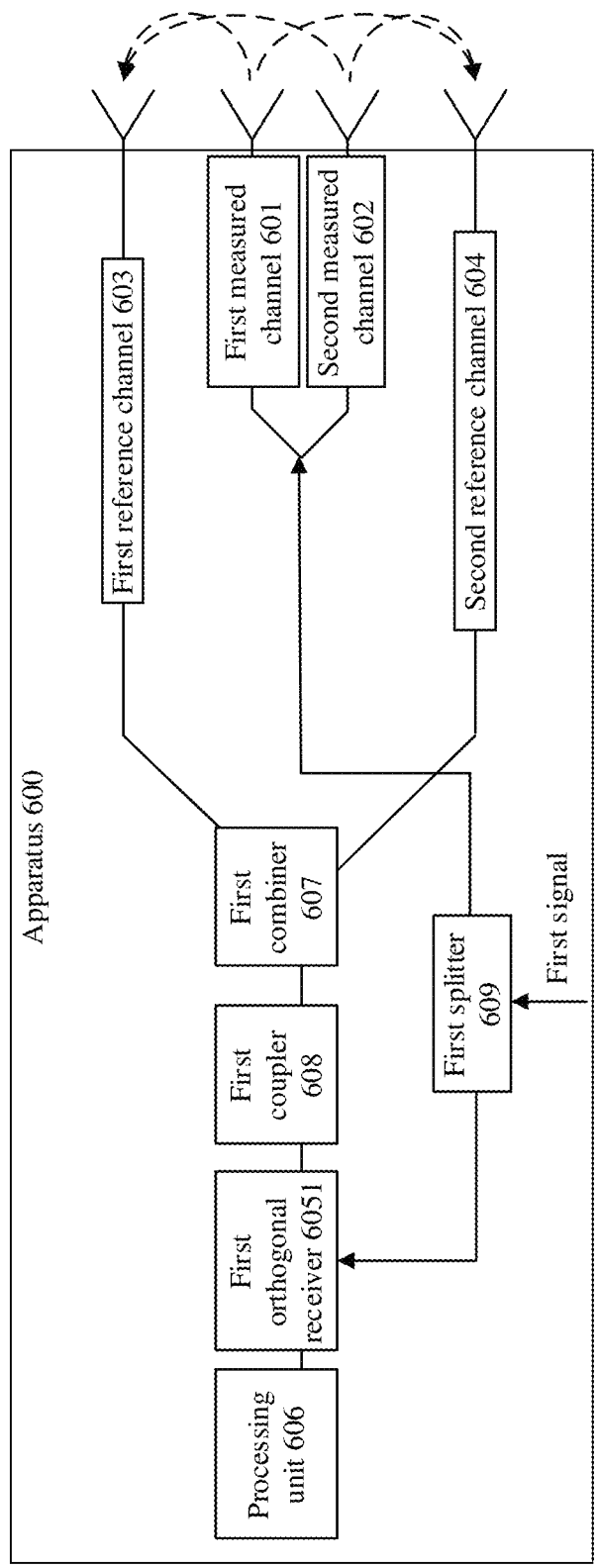
FIG. 10 is a schematic diagram of a structure of the second transmission channel calibration system according to an embodiment of this application.

In addition, with reference to FIG. 9, as shown in FIG. 10, the apparatus 600 may further include a first splitter 609, and the first splitter 609 is separately connected to the first measured channel 601, the second measured channel 602, and the first orthogonal receiver 6051 to separately input the first signal into the first measured channel 601, the second measured channel 602, and the first orthogonal receiver 6051.

Figure 11:
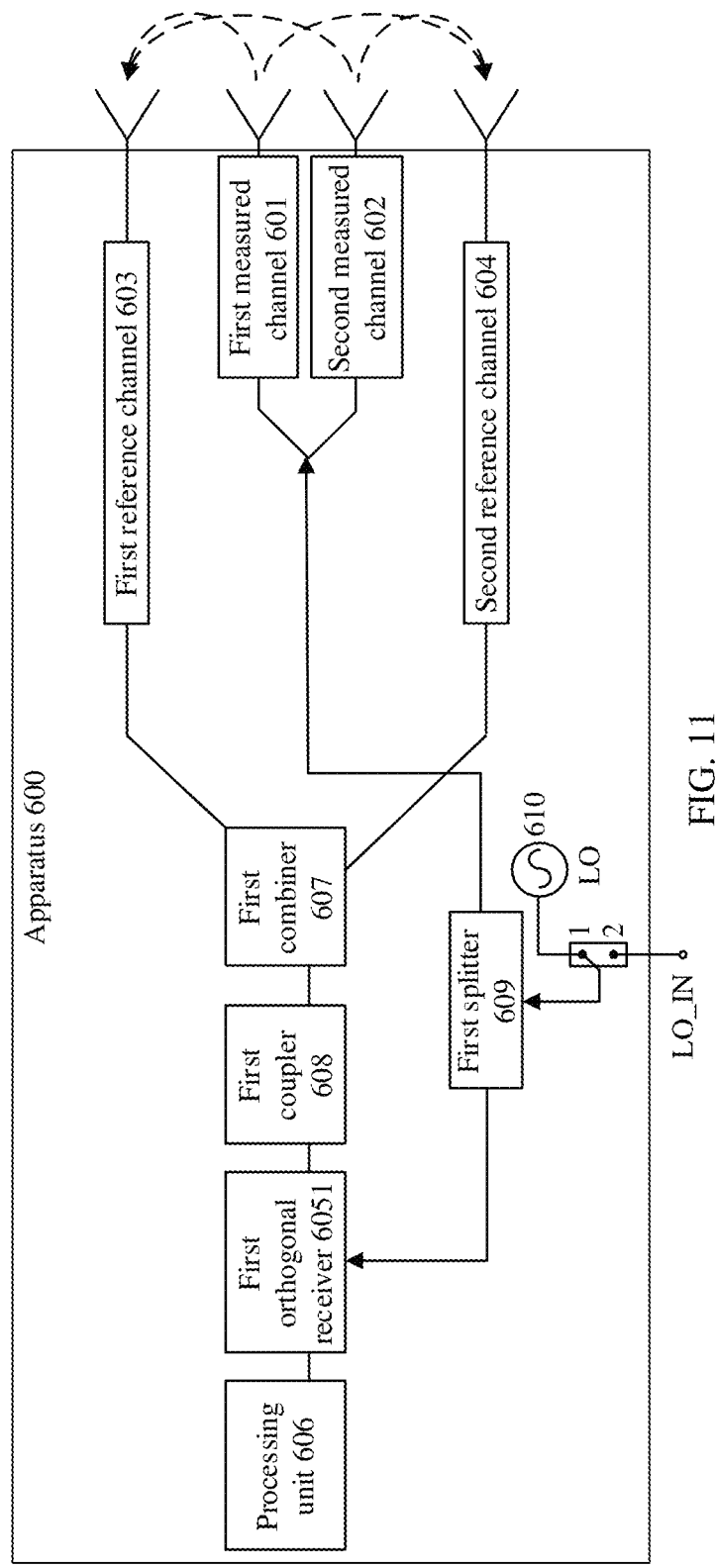
FIG. 11 is a schematic diagram of a structure of the third transmission channel calibration system according to an embodiment of this application.

Further, with reference to FIG. 10, as shown in FIG. 11, the apparatus 600 may be an apparatus into which a radio frequency (radio frequency, RF) signal is input. For example, the radio frequency apparatus is a radio frequency chip or a radio frequency module. The first signal may be a radio frequency signal that comes from the outside. For example, the radio frequency signal that comes from the outside may be generated by an external local oscillator (local oscillator, LO). Alternatively, the apparatus further includes a signal generator 610 connected to the first splitter 609, the signal generator 610 is configured to generate a radio frequency signal, and the radio frequency signal includes the first signal. Optionally, the signal generator 610 may be a local oscillator. In FIG. 11, an example in which the signal generator 610 is an LO is described, and LO_IN indicates external LO input.

Figure 12:
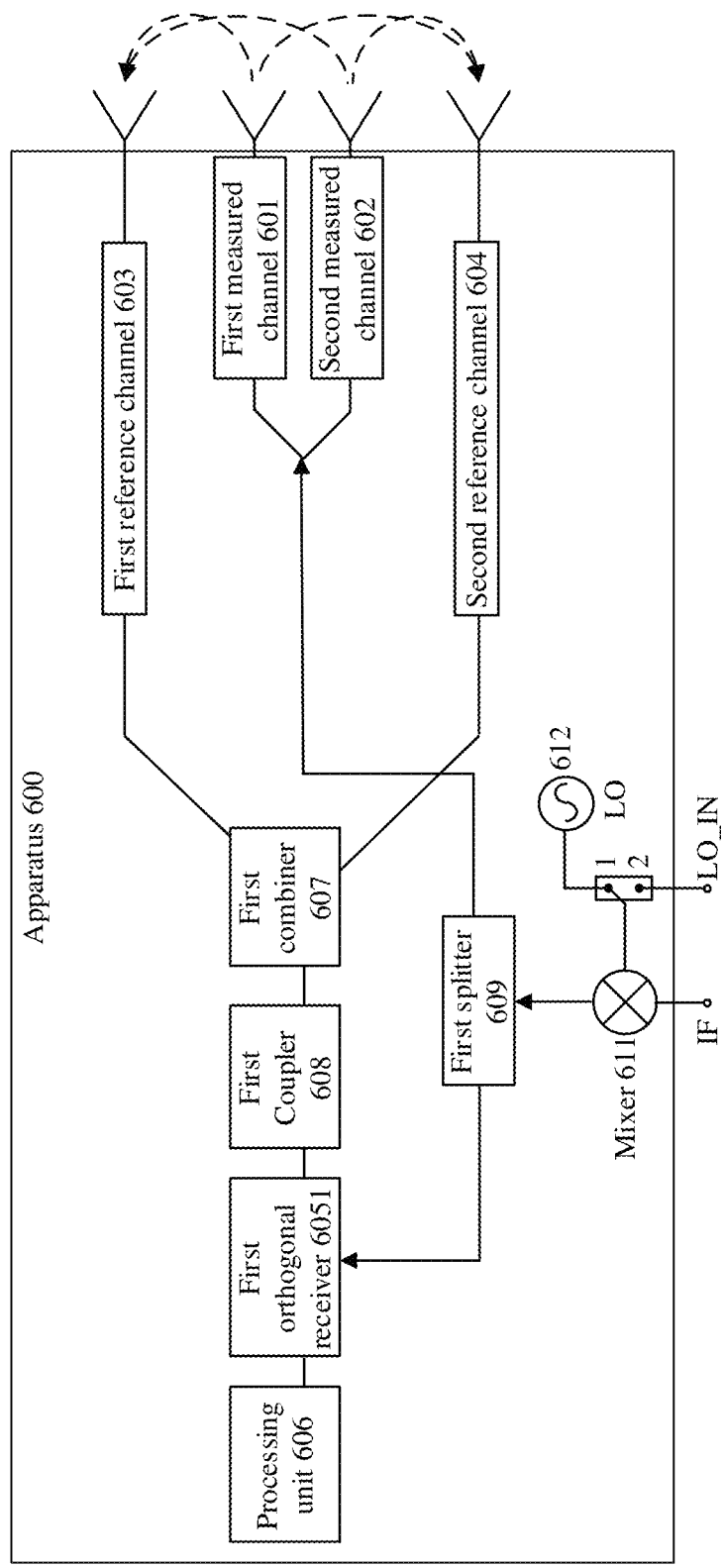
FIG. 12 is a schematic diagram of a structure of the fourth transmission channel calibration system according to an embodiment of this application.

Further, with reference to FIG. 10, as shown in FIG. 12, the apparatus 600 may be an apparatus into which an intermediate frequency (intermediate frequency, IF) signal is input. For example, the apparatus includes an intermediate frequency chip or an intermediate frequency module. The apparatus may further include a mixer 611. The mixer 611 is configured to perform frequency mixing processing on the intermediate frequency signal and a correction signal to obtain the first signal. The correction signal may come from the outside. For example, the correction signal that comes from the outside may be generated by an external LO. Alternatively, the apparatus further includes a signal generator 612 connected to the first splitter 609 by using the mixer 611, and the signal generator 612 is configured to generate the correction signal. Optionally, the signal generator 612 may be an LO. In FIG. 12, an example in which the signal generator 612 is an LO is described, and LO_IN indicates external LO input, and IF indicates an intermediate frequency signal input end.

Figure 13:
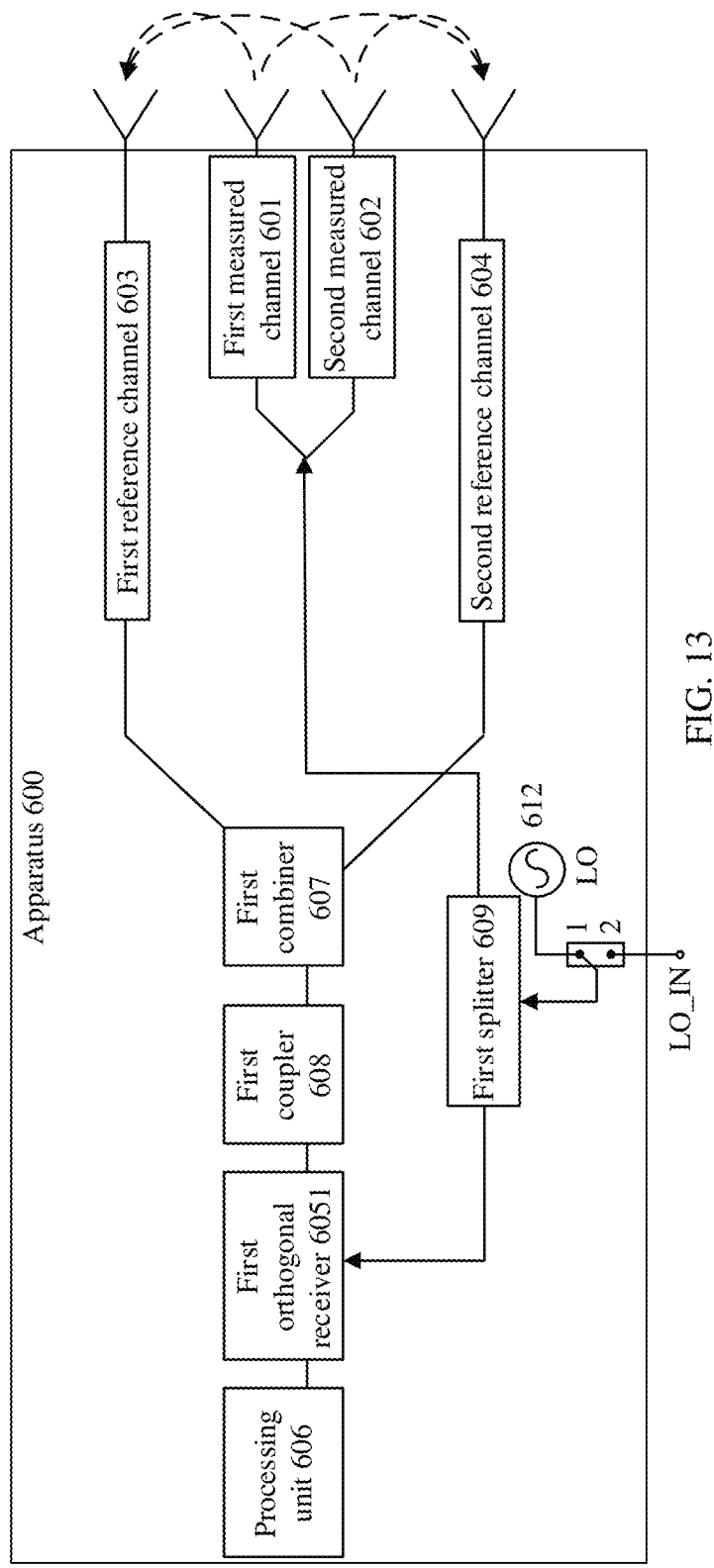
FIG. 13 is a schematic diagram of a structure of the fifth transmission channel calibration system according to an embodiment of this application.

Further, with reference to FIG. 10, as shown in FIG. 13, the apparatus 600 may be an apparatus into which a baseband signal is input. For example, the apparatus includes a baseband chip or a baseband module. The first signal comes from the outside. For example, the first signal may be generated by an external LO. Alternatively, the apparatus further includes a signal generator 613 connected to the first splitter 609, the signal generator 613 is configured to generate the first signal. In FIG. 13, an example in which the signal generator 613 is an LO is described, and LO_IN indicates external LO input.

During actual application, the apparatus into which the baseband signal is input may usually include the baseband module, an intermediate frequency module, and a radio frequency module. When the apparatus is the apparatus into which the baseband signal is input, the first signal may be provided by the radio frequency module, may be provided by the intermediate frequency module, or may be provided by the baseband module. This is not specifically limited in this embodiment of this application.

Further, the apparatus 600 may alternatively be integrated into a wireless channel device. For example, the wireless channel device may be a base station, or may be a terminal. When the wireless channel device is a base station, a semiconductor chip into which a plurality of transmission channels are integrated may be located outside the wireless channel device. When the wireless channel device is a terminal, the apparatus 600 and the plurality of transmission channels may be integrated into the terminal, and may be integrated into a same semiconductor chip, or may be integrated into different semiconductor chips.

In this embodiment of this application, the first measured channel and the second measured channel 602 may be used as transmit channels, or may be used as receive channels. The foregoing describes the calibration process of the first measured channel 601 and the second measured channel 602 used as transmit channels. The following describes a calibration process of the first measured channel 601 and the second measured channel 602 used as receive channels.

In the transmission channel calibration apparatus 600, the vector detection unit 605 is further configured to: when the first reference channel 603 transmits a second signal, separately perform detection based on a fifth feedback signal and a sixth feedback signal that are respectively received by the first measured channel 601 and the second measured channel 602, to obtain a fifth signal vector and a sixth signal vector; and when the second reference channel 604 transmits the second signal, separately perform detection based on a seventh feedback signal and an eighth feedback signal that are respectively output by the first measured channel 601 and the second measured channel 602, to obtain a seventh signal vector and an eighth signal vector. The fifth signal vector, the sixth signal vector, the seventh signal vector, and the eighth signal vector are used to calibrate the deviation between the first measured channel 601 and the second measured channel 602.

The processing unit 606 is further configured to calibrate the deviation between the first measured channel 601 and the second measured channel 602 based on the fifth signal vector, the sixth signal vector, the seventh signal vector, and the eighth signal vector.

The second signal may be a signal that is the same as the first signal, or may be a signal that is different from the first signal.

Figure 14:
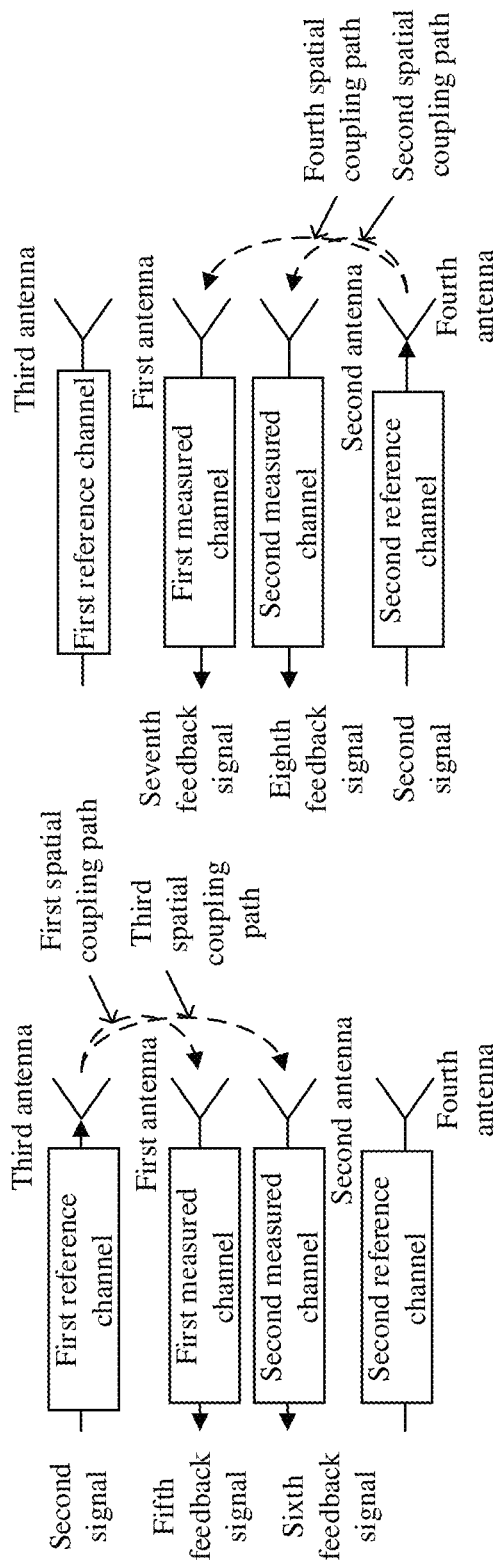
FIG. 14 is a schematic diagram of a structure of the sixth transmission channel calibration system according to an embodiment of this application.

When the first reference channel 603 and the second reference channel 604 transmit the second signal, the first measured channel 601 and the second measured channel 602 may receive the air loopback signal by using different spatial coupling paths. Specifically, as shown in FIG. 14, the second signal transmitted by the first reference channel 603 is transmitted to the first measured channel 601 and the second measured channel 602 respectively by using the first spatial coupling path and the third spatial coupling path, and the first measured channel 601 and the second measured channel 602 respectively output the fifth feedback signal and the sixth feedback signal. The second signal transmitted by the second reference channel 604 is transmitted to the first measured channel 601 and the second measured channel 602 respectively by using the fourth spatial coupling path and the second spatial coupling path, and the first measured channel 601 and the second measured channel 602 respectively output the seventh feedback signal and the eighth feedback signal.

It can be learned from FIG. 14 that, because the foregoing position relationship exists between the plurality of transmission channels, attenuation and loss of the second signal in the first spatial coupling path may be considered approximately equal to attenuation and loss of the second signal in the second spatial coupling path. Similarly, attenuation and loss of the second signal in the third spatial coupling path may be considered approximately equal to attenuation and loss of the second signal in the fourth spatial coupling path. Therefore, a difference between a sum of the fifth feedback signal and the seventh feedback signal and a sum of the sixth feedback signal and the eighth feedback signal is calculated to offset an error of the second signal in the spatial coupling paths, and the difference can reflect the signal deviation between the first measured channel 601 and the second measured channel 602.

It should be understood that the foregoing descriptions of the process of transmitting the second signal are merely for illustrating an input and an output relationship of the signal, and do not indicate that the first reference channel 603 and the second reference channel 604 need to transmit the second signal at different moments. In other words, the first reference channel 603 and the second reference channel 604 may simultaneously transmit the second signal, or may separately transmit the second signal at different moments.

The vector detection unit 605 and the processing unit 606 may calibrate the first measured channel 601 and the second measured channel 602 used as receive channels. The following describes specific processing processes of the vector detection unit 605 and the processing unit 606 in a process of calibrating a receive channel.

I. Processing Process of the Vector Detection Unit 605

The specific processing process of the vector detection unit 605 may be summarized as follows: The vector detection unit 605 separately performs detection on the fifth feedback signal, the sixth feedback signal, the seventh feedback signal, and the eighth feedback signal to obtain the fifth signal vector, the sixth signal vector, the seventh signal vector, and the eighth signal vector.

Two points need to be described for the processing process of the vector detection unit 605.

1. The vector detection unit 605 may perform one or more times of detection on each feedback signal. The vector detection unit 605 obtains one signal vector when performing one time of detection on each feedback signal, or obtains a plurality of signal vectors when performing a plurality of times of detection on each feedback signal. The following embodiment describes an example in which the vector detection unit 605 performs one time of detection on the feedback signal.

2. In specific implementation, a specific process of detecting the feedback signal by the vector detection unit 605 may be that the vector detection unit 605 performs frequency mixing processing on the second signal and the feedback signal to obtain the signal vector. For example, the vector detection unit 605 performs frequency mixing processing on the second signal and the fifth feedback signal to obtain the fifth signal vector, and the vector detection unit 605 performs frequency mixing processing on the second signal and the seventh feedback signal to obtain the seventh signal vector.

Specifically, the signal vector obtained by the vector detection unit 605 through detection may include one or both of an amplitude vector and a phase vector. For example, the fifth signal vector may include a fifth amplitude vector and a fifth phase vector, the fifth amplitude vector is used to reflect amplitude information of the fifth feedback signal, and the fifth phase vector is used to reflect phase information of the fifth feedback signal. For example, the seventh signal vector may include a seventh amplitude vector and a seventh phase vector, the seventh amplitude vector is used to reflect amplitude information of the seventh feedback signal, and the seventh phase vector is used to reflect phase information of the seventh feedback signal.

II. Processing Process of the Processing Unit 606

The specific processing process of the processing unit 606 may be summarized as follows: The processing unit 606 calibrates the deviation between the first measured channel 601 and the second measured channel 602 based on the fifth signal vector, the sixth signal vector, the seventh signal vector, and the eighth signal vector.

Specifically, the processing unit may determine a second deviation correction value between the first measured channel 601 and the second measured channel 602 based on the signal vector obtained through detection. The second deviation correction value is used to calibrate the deviation between the first measured channel 601 and the second measured channel (used as receive channels).

Because the signal vector may include one or both of an amplitude vector and a phase vector, correspondingly, the second deviation correction value may include one or both of a second amplitude correction value and a second phase correction value. The second amplitude correction value is used to calibrate an amplitude deviation between the first measured channel 601 and the second measured channel 602, and the second phase correction value is used to calibrate a phase deviation between the first measured channel 601 and the second measured channel 602.

Because the length of the first spatial coupling path between the first antenna and the third antenna is equal to that of the second spatial coupling path between the second antenna and the fourth antenna, and the length of the third spatial coupling path between the second antenna and the third antenna is equal to that of the fourth spatial coupling path between the first antenna and the fourth antenna, the sum of the fifth signal vector and the seventh signal vector is calculated, and then the difference between the sum and the sum of the sixth signal vector and the eighth signal vector is calculated to offset the error of the second signal in the spatial coupling paths. The processing unit 606 may determine a deviation correction value between the first measured channel 601 and the second measured channel 602 based on the fifth signal vector, the sixth signal vector, the seventh signal vector, and the eighth signal vector.

The following describes the specific processing process of the processing unit by using a specific example.

It is assumed that the fifth signal vector is $(A_5,\theta_5)$, the sixth signal vector is $(A_6,\theta_6)$, the seventh signal vector is $(A_7,\theta_7)$, and the eighth signal vector is $(A_8, \theta_8)$. The processing unit may determine the first amplitude correction value $\Delta A_{12}$ between the first measured channel 601 and the second measured channel 602 based on four amplitude vectors $A_5$, $A_6$, $A_7$, and $A_8$, and determine the first phase correction value $\Delta\theta_{12}$ between the first measured channel 601 and the second measured channel 602 based on four phase vectors $\theta_5$, $\theta_6$, $\theta_7$, and $\theta_8$. For example, the processing unit may determine $\Delta A_{12}$ based on the following Formula (3), and determine $\Delta\theta_{12}$ based on the following Formula (4):

$$\Delta A_{12} = \frac{1}{2}(A_5 + A_7 - A_6 - A_8) \quad (3)$$

$$\Delta\theta_{12} = \frac{1}{2}(\theta_5 + \theta_7 - \theta_6 - \theta_8) \quad (4)$$

Figure 15:
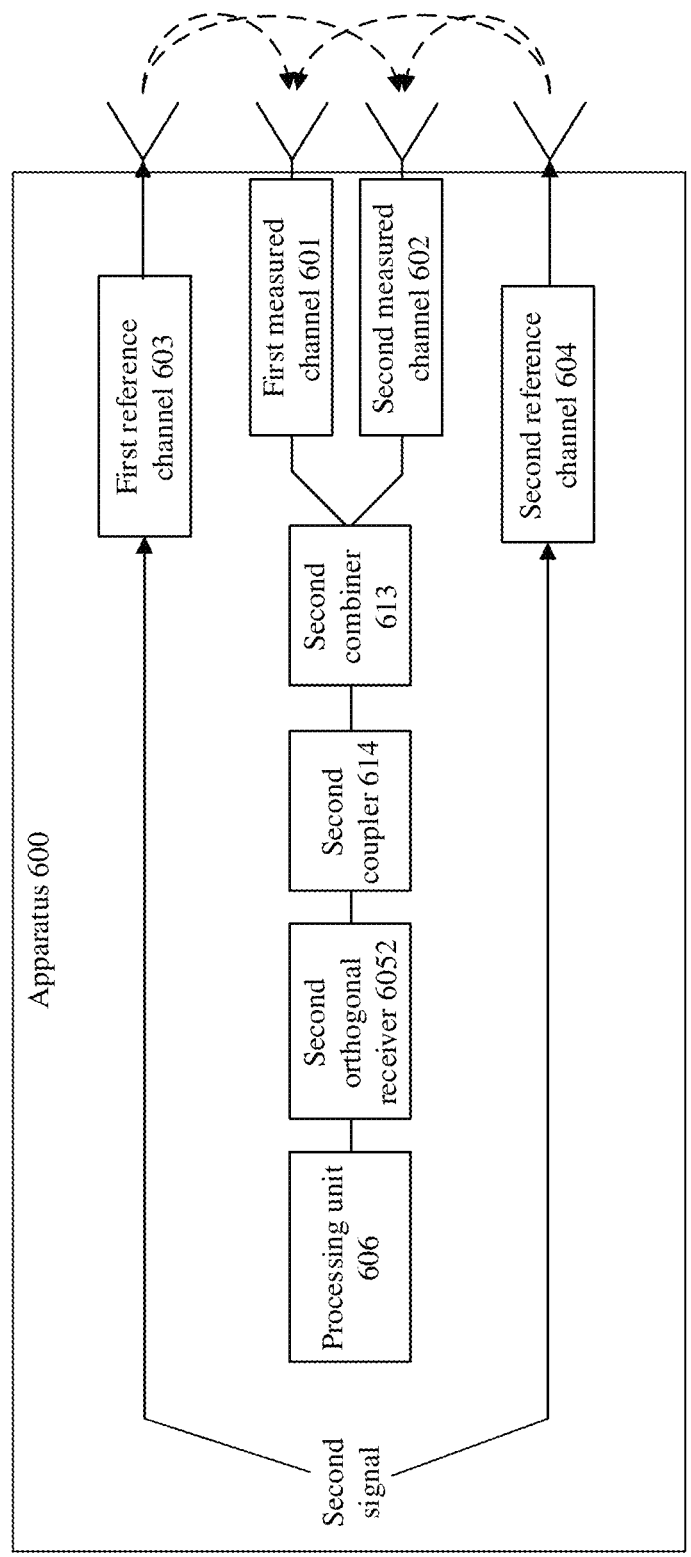
FIG. 15 is a schematic diagram of a structure of the seventh transmission channel calibration system according to an embodiment of this application.

In addition, the vector detection unit 605 may include a second orthogonal receiver 6052. As shown in FIG. 15, the first measured channel 601 and the second measured channel 602 are combined by using a second combiner 613, and the second orthogonal receiver 6052 is connected to the second combiner 613 by using a second coupler 614.

When the first reference channel 603 transmits the second signal, the second orthogonal receiver 6052 is configured to perform frequency mixing processing on the second signal and the fifth feedback signal and on the second signal and the sixth feedback signal to obtain the fifth signal vector and the sixth signal vector. When the second reference channel 604 transmits the second signal, the second orthogonal receiver 6052 is configured to perform frequency mixing processing on the second signal and the seventh feedback signal and on the second signal and the eighth feedback signal to obtain the seventh signal vector and the eighth signal vector.

Figure 16:
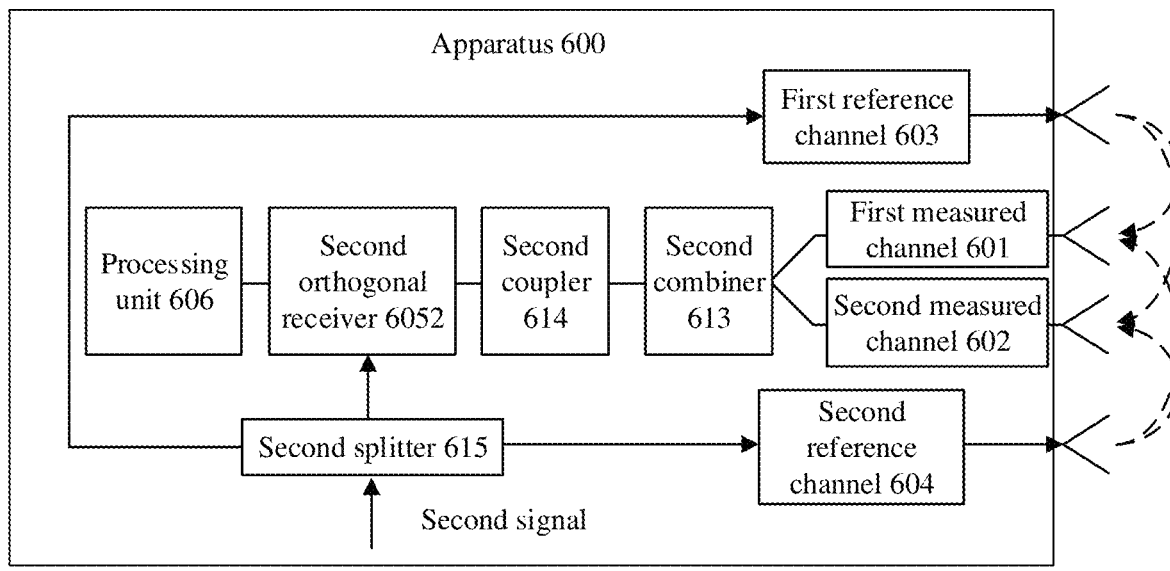
FIG. 16 is a schematic diagram of a structure of the eighth transmission channel calibration system according to an embodiment of this application.

In addition, with reference to FIG. 15, as shown in FIG. 16, the apparatus 600 may further include a second splitter 615, and the second splitter 615 is separately connected to the first reference channel 603, the second reference channel 604, and the second orthogonal receiver 6052 to separately input the second signal into the first reference channel 603, the second reference channel 604, and the second orthogonal receiver 6052.

In addition, the second signal may also be input into the apparatus 600 in the three manners, shown in FIG. 11 to FIG. 13, of inputting the first signal, and details are not described herein again.

In conclusion, the transmission channel calibration apparatus provided in this embodiment of this application can calibrate the deviation between the first measured channel 601 and the second measured channel 602. Because the first measured channel 601 and the second measured channel 602 are symmetrically arranged, and the first reference channel 603 and the second reference channel 604 are symmetrically arranged, the length of the first spatial coupling path between the first antenna and the third antenna is equal to that of the second spatial coupling path between the second antenna and the fourth antenna, and the length of the third spatial coupling path between the second antenna and the third antenna is equal to that of the fourth spatial coupling path between the first antenna and the fourth antenna. Attenuation and loss of the first signal in the first spatial coupling path may be considered approximately equal to attenuation and loss of the first signal in the second spatial coupling path. Similarly, attenuation and loss of the first signal in the third spatial coupling path may be considered approximately equal to attenuation and loss of the first signal in the fourth spatial coupling path. Therefore, when processing the signal vector obtained by the vector detection unit 605 through detection, the processing unit 606 calculates the sum of the first signal vector and the second signal vector, and then calculates the difference between the sum and the sum of the third signal vector and the fourth signal vector to offset the error of the first signal in the spatial coupling paths, so that the deviation correction value between the first measured channel 601 and the second measured channel 602 is accurately determined.

According to the solution provided in this embodiment of this application, the first reference channel 603 and the second reference channel 604 that meet the foregoing position relationship can be found for the first measured channel 601 and the second measured channel 602 at any position. For example, for two measured channels with adjacent physical positions, the first reference channel 603 and the second reference channel 604 that are symmetrically arranged can also be found to eliminate a deviation in spatial coupling paths by using a symmetrical structure between antennas, thereby improving calibration accuracy of the apparatus 600. Compared with the conventional technology, the solution provided in this embodiment of this application can calibrate the first measured channel 601 and the second measured channel 602 at any position, to implement calibration of all transmission channels in a system. This solution has relatively high adaptability.

Assuming that the system includes N transmission channels, the N transmission channels may be grouped based on a position relationship between the N transmission channels, and by using the solution provided in this application, a deviation correction value (a relative deviation) between transmission channels in each group is measured, and then an absolute deviation between the N transmission channels is calculated based on the deviation correction value between transmission channels in each group, to compensate for a deviation between the N transmission channels. Alternatively, the N transmission channels may be grouped based on a position relationship between the N transmission channels, and by using the solution provided in this application, a deviation correction value (a relative deviation) between transmission channels in each group is measured, and then a deviation between two transmission channels in each group is compensated for based on the deviation correction value. There can be no deviation between the N transmission channels in the system by compensating each group of transmission channels.

Specifically, the system including the N transmission channels may be a phased array system, to implement directional signal transmission in the system and improve a system communication distance and a system capacity; or the system including the N transmission channels may be a multiple input multiple output (multiple input multiple output, MIMO) system, to improve a system capacity. Certainly, the system including the N transmission channels may be another system in which the N transmission channels need to be calibrated. A specific type of the system is not limited in this application.

With reference to the apparatus 600 shown in FIG. 10 and the apparatus 600 shown in FIG. 16, it can be learned that in the apparatus 600, the first combiner 607 and the second splitter 615 may be implemented by using one power combiner/power splitter (combiner/splitter, CS), and the first splitter 609 and the second combiner 613 may be implemented by using one CS. The first orthogonal receiver 6051 and the second orthogonal receiver 6052 may be implemented by using a same orthogonal receiver, and the first coupler 608 and the second coupler 614 may be implemented by using a same coupler. In this case, the apparatus can calibrate a transmit channel, and can also calibrate a receive channel.

The following provides a specific example of a transmission channel calibration apparatus.

Figure 17:
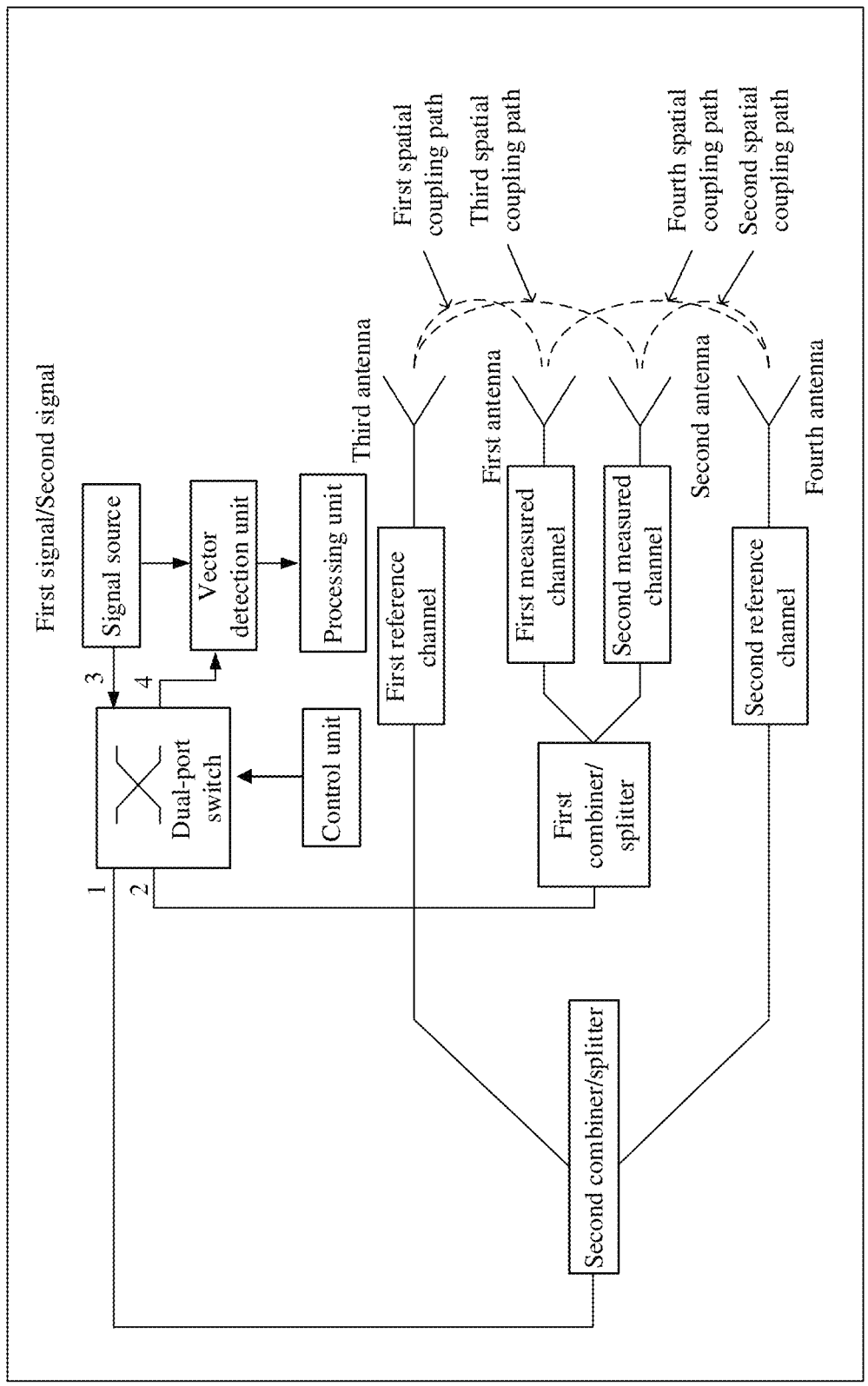
FIG. 17 is a schematic diagram of a structure of the ninth transmission channel calibration system according to an embodiment of this application.

A schematic diagram of a structure of a transmission channel calibration apparatus may be shown in FIG. 17. The apparatus can calibrate a transmit channel, and can also calibrate a receive channel. In the apparatus shown in FIG. 17, a signal source is configured to transmit a first signal and a second signal. In different operating modes, the first signal is output to a first combiner/splitter (equivalent to a component into which functions of the first splitter 609 and the second combiner 613 are integrated), or the second signal is output to a second combiner/splitter (equivalent to a component into which functions of the first combiner 607 and the second splitter 615 are integrated). A feedback signal obtained through antenna air loopback is sent to a vector detection unit (which may be considered as the vector detection unit 605) under control of a control unit. After processing by the vector detection unit, a plurality of signal vectors are output to a processing unit (which may be considered as the processing unit 606). The processing unit determines a deviation correction value between a first measured channel and a second measured channel based on the plurality of signal vectors, and calibrates a deviation between the first measured channel and the second measured channel based on the deviation correction value.

The apparatus shown in FIG. 17 can be configured to calibrate receive channels of the first measured channel and the second measured channel, and can also calibrate transmit channels of the first measured channel and the second measured channel. Specifically, the control unit may control a dual-port switch to perform switching between two functions of receive channel calibration and transmit channel calibration.

1. Transmit Channel Calibration

The first signal may be output to the first combiner/splitter through switching of the dual-port switch. In this case, a port 3 of the dual-port switch inputs the first signal, and the first signal is output by using a port 2. Specifically, during transmit channel calibration, a signal flow direction in the apparatus shown in FIG. 17 may be shown in FIG. 18.

The first signal is output to the first combiner/splitter by using the dual-port switch, and is transmitted by using the first measured channel and the second measured channel (in this case, the first measured channel and the second measured channel are used as transmit channels).

For the first signal transmitted on the first measured channel, the first signal is transmitted to a first reference channel and a second reference channel respectively by using a first spatial coupling path and a fourth spatial coupling path. Signals output by the first reference channel and the second reference channel are combined and are then transmitted to the vector detection unit by using a port 1 of the dual-port switch. The vector detection unit detects a first feedback signal output by the first reference channel and a second feedback signal output by the second reference channel.

For the first signal transmitted on the second measured channel, the first signal is transmitted to the first reference channel and the second reference channel by using a third spatial coupling path and a second spatial coupling path. Signals output by the first reference channel and the second reference channel are combined and are then transmitted to the vector detection unit by using the port 1 of the dual-port switch. The vector detection unit detects a third feedback signal output by the first reference channel and a fourth feedback signal output by the second reference channel.

Figure 18:
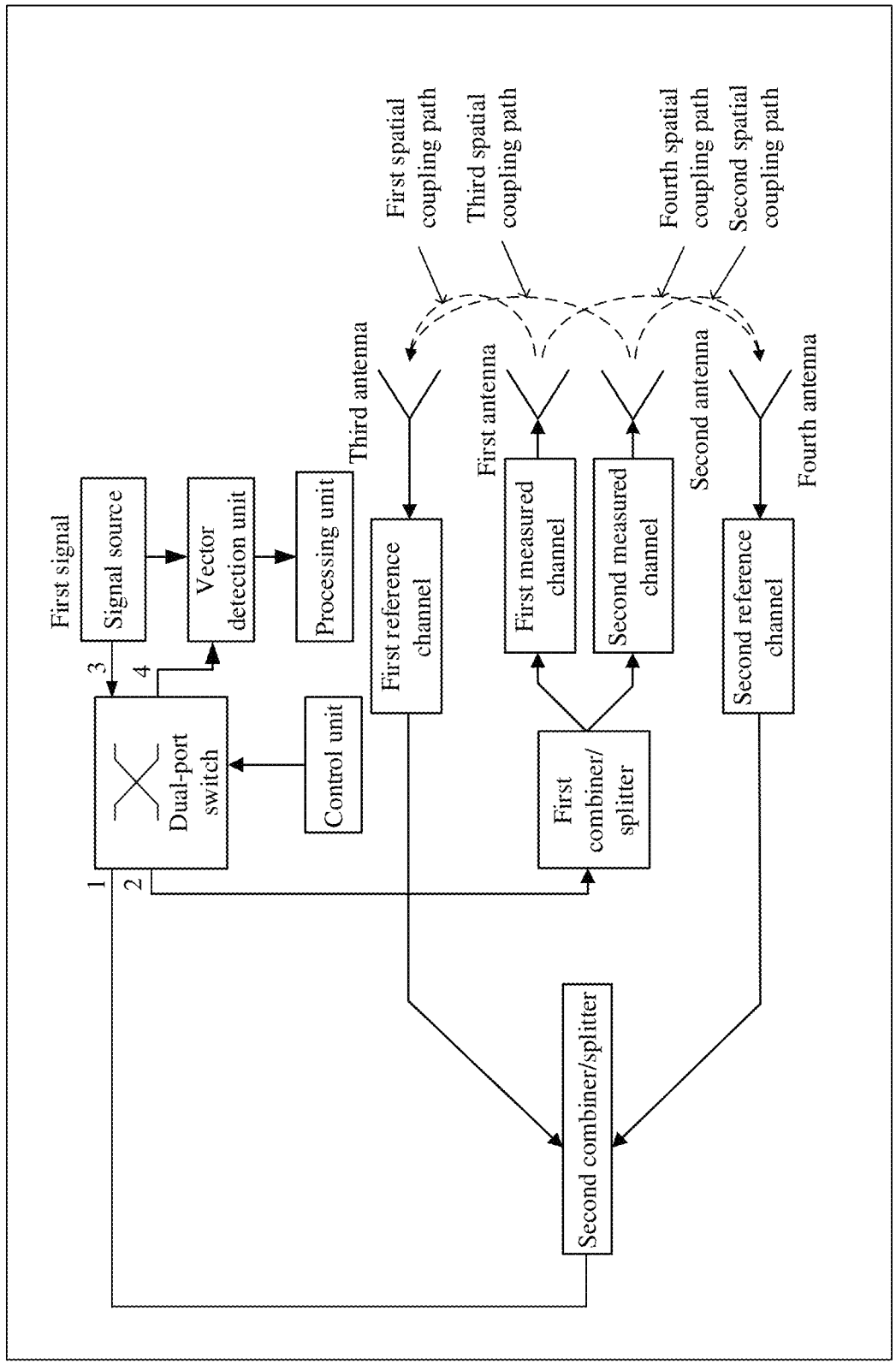
FIG. 18 is a schematic diagram of a structure of the tenth transmission channel calibration system according to an embodiment of this application.

In the apparatus shown in FIG. 18, a specific processing process of the vector detection unit is as follows: The vector detection unit separately performs detection on the first feedback signal to the fourth feedback signal to obtain a first signal vector to a fourth signal vector.

In the apparatus shown in FIG. 18, a specific processing process of the processing unit is as follows: The processing unit determines a deviation correction value between the first measured channel and the second measured channel based on the signal vector obtained through detection. The deviation correction value is used to calibrate the deviation between the first measured channel and the second measured channel.

Each signal vector may include amplitude information and phase information, and the deviation correction value generated by the processing unit may include one or both of an amplitude correction value and a phase correction value. An amplitude deviation between the measured channels may be calibrated based on the amplitude correction value, and a phase deviation between the measured channels may be calibrated based on the phase correction value.

It is assumed that the first signal vector is $(A_1,\theta_1)$, the second signal vector is $(A_2,\theta_2)$, the third signal vector is $(A_3,\theta_3)$, and the fourth signal vector is $(A_4,\theta_4)$. The processing unit may determine the amplitude correction value $\Delta A_{12}$ between the first measured channel and the second measured channel based on $A_1$, $A_2$, $A_3$, and $A_4$, and determine the phase correction value $\Delta\theta_{12}$ between the first measured channel and the second measured channel based on $\theta_1$, $\theta_2$, $\theta_3$, and $\theta_4$. For example, the processing unit may determine $\Delta A_{12}$ and $\Delta\theta_{12}$ based on the following formulas:

$$\Delta A_{12}=\tfrac{1}{2}(A_1+A_2-A_3-A_4)$$

$$\Delta\theta_{12}=\tfrac{1}{2}(\theta_1+\theta_2-\theta_3-\theta_4)$$

2. Receive Channel Calibration

Figure 19:
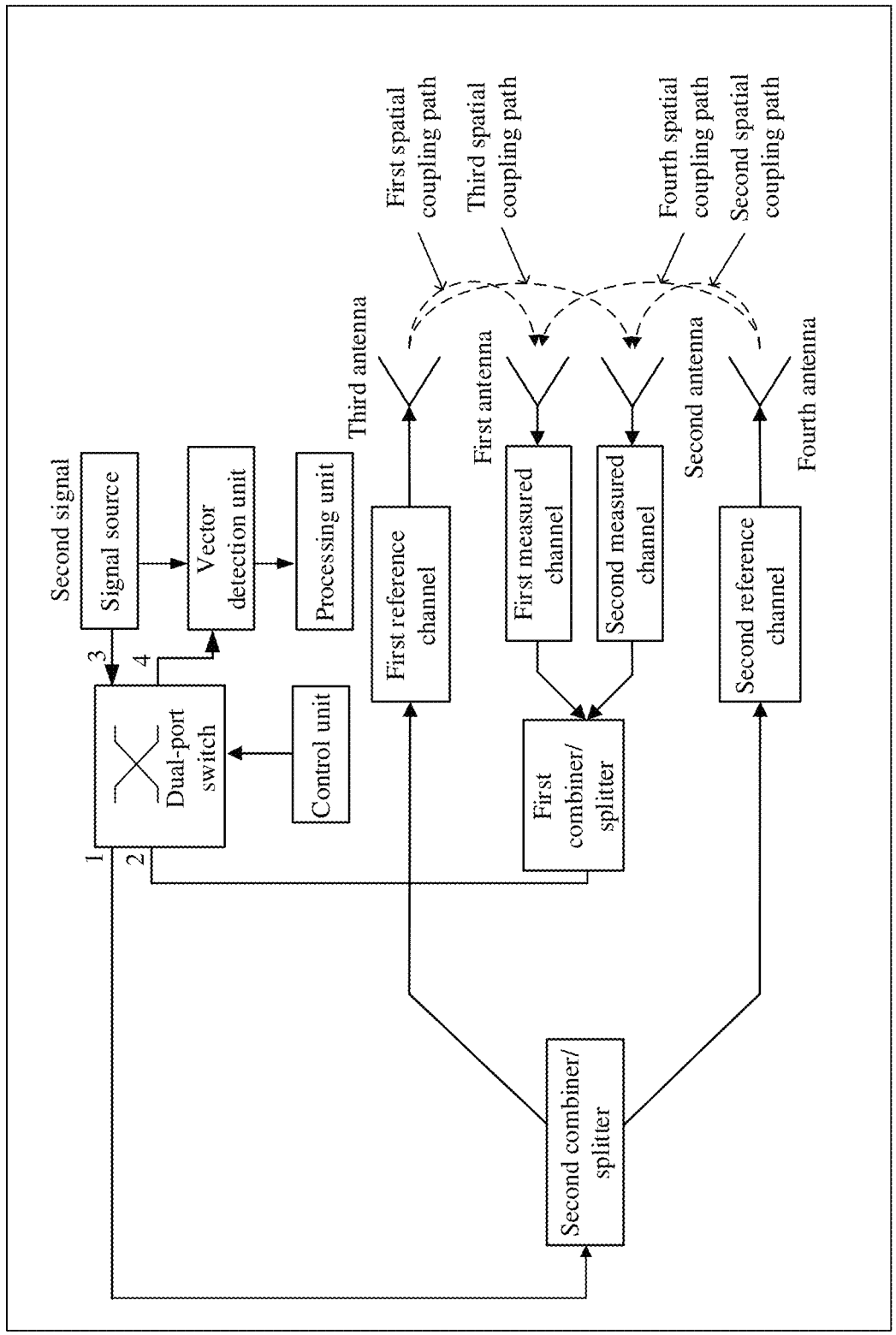
FIG. 19 is a schematic diagram of a structure of the eleventh transmission channel calibration system according to an embodiment of this application.

The second signal may be output to the second combiner/splitter through switching of the dual-port switch. In this case, a port 3 of the dual-port switch inputs the second signal, and the second signal is output by using a port 1. Specifically, during receive channel calibration, a signal flow direction in the apparatus shown in FIG. 17 may be shown in FIG. 19.

The second signal is output to the second combiner/splitter by using the dual-port switch, and is transmitted by using a first reference channel and a second reference channel (in this case, the first measured channel and the second measured channel are used as receive channels).

For the second signal transmitted on the first reference channel, the second signal is transmitted to the first measured channel and the second measured channel respectively by using a first spatial coupling path and a third spatial coupling path. Signals of the first measured channel and the second measured channel are combined and are then transmitted to the vector detection unit by using a port 2 of the dual-port switch. The vector detection unit detects a fifth feedback signal output by the first measured channel and a sixth feedback signal output by the second measured channel.

For the second signal transmitted on the second measured channel, the second signal is transmitted to the first measured channel and the second measured channel by using a fourth spatial coupling path and a second spatial coupling path. Signals of the first measured channel and the second measured channel are combined and are then transmitted to the vector detection unit by using the port 2 of the dual-port switch. The vector detection unit detects a seventh feedback signal output by the first measured channel and an eighth feedback signal output by the second measured channel.

A specific processing process of the vector detection unit is as follows: The vector detection unit separately performs detection on the fifth feedback signal to the eighth feedback signal to obtain a fifth signal vector to an eighth signal vector.

A specific processing process of the processing unit is as follows: The processing unit determines a deviation correction value between the first measured channel and the second measured channel based on the signal vector obtained through detection. The deviation correction value is used to calibrate the deviation between the first measured channel and the second measured channel. Each signal vector may include amplitude information and phase information, and the deviation correction value generated by the processing unit may include one or both of an amplitude correction value and a phase correction value. An amplitude deviation between the measured channels may be calibrated based on the amplitude correction value, and a phase deviation between the measured channels may be calibrated based on the phase correction value.

It is assumed that the fifth signal vector is $(A_5,\theta_5)$, the sixth signal vector is $(A_6,\theta_6)$, the seventh signal vector is $(A_7,\theta_7)$, and the eighth signal vector is $(A_8,\theta_8)$. The processing unit may determine the amplitude correction value $\Delta A_{12}$ between the first measured channel and the second measured channel based on $A_5$, $A_6$, $A_7$, and $A_8$, and determine the phase correction value $\Delta\theta_{12}$ between the first measured channel and the second measured channel based on $\theta_5$, $\theta_6$, $\theta_7$, and $\theta_8$. For example, the processing unit may determine $\Delta A_{12}$ and $\Delta\theta_{12}$ based on the following formulas:

$$\Delta A_{12} = \tfrac{1}{2}(A_5 + A_7 - A_6 - A_8)$$

$$\Delta\theta_{12} = \tfrac{1}{2}(\theta_5 + \theta_7 - \theta_6 - \theta_8)$$

It should be noted that for implementations not described in detail in the apparatus shown in FIG. 17, refer to related descriptions in the foregoing embodiment of the apparatus 600. Details are not described herein again.

It is clear that a person skilled in the art can make various modifications and variations to the embodiments of this application without departing from the scope of the embodiments of this application. In this way, this application is intended to cover these modifications and variations of the embodiments of this application provided that they fall within the scope of protection defined by the following claims and their equivalent technologies.

What is claimed is:

1. A transmission channel calibration apparatus, comprising:
   a first port including a first measured channel, a second port including a second measured channel, a third port including a first reference channel, and a fourth port including a second reference channel, wherein the first measured channel and the second measured channel are symmetrically arranged, and the first reference channel and the second reference channel are symmetrically arranged; and
   a vector detector coupled to the first port, the second port, the third port, and the fourth port, and configured to:
     separately perform detection at a first time based on a first feedback signal and a second feedback signal that are respectively output by the first reference channel and the second reference channel to thereby obtain a first signal vector and a second signal vector in response to the first port being configured to transmit a first signal; and
     separately perform detection at a second time different from the first time based on a third feedback signal and a fourth feedback signal that are respectively output by the first reference channel and the second reference channel, to obtain a third signal vector and a fourth signal vector in response to the second port being configured to transmit the first signal,
   wherein the first signal vector, the second signal vector, the third signal vector, and the fourth signal vector are useable to calibrate a deviation between the first measured channel and the second measured channel.

2. The apparatus according to claim 1, wherein the first signal transmitted by the first measured channel to the first reference channel by a first spatial coupling path, the first signal transmitted by the second measured channel to the second reference channel by a second spatial coupling path, the first signal transmitted by the second measured channel to the first reference channel by a third spatial coupling path, and the first signal transmitted by the first measured channel to the second reference channel by a fourth spatial coupling path.

3. The apparatus according to claim 2, wherein a length of the first spatial coupling path is equal to a length of the second spatial coupling path, and a length of the third spatial coupling path is equal to a length of the fourth spatial coupling path.

4. The apparatus according to claim 1, further comprising:
   a processor configured to calibrate the deviation between the first measured channel and the second measured channel based on the first signal vector, the second signal vector, the third signal vector, and the fourth signal vector.

5. The apparatus according to claim 4, wherein the processor configured to calibrate the deviation between the first measured channel and the second measured channel based on the first signal vector, the second signal vector, the third signal vector, and the fourth signal vector, the processor is further configured to:
   determine a first deviation correction value between the first measured channel and the second measured channel based on the first signal vector, the second signal vector, the third signal vector, and the fourth signal vector; and
   calibrate the deviation between the first measured channel and the second measured channel based on the first deviation correction value.

6. The apparatus according to claim 5, wherein the first deviation correction value comprises a first amplitude correction value and a first phase correction value.

7. The apparatus according to claim 1, further comprising: a first combiner and a first coupler, wherein the vector detector comprises a first orthogonal receiver; and wherein
   the first reference channel and the second reference channel are combined by the first combiner, and the first orthogonal receiver is connected to the first combiner by the first coupler;
   the first orthogonal receiver is configured to perform frequency mixing processing on the first signal and the first feedback signal, and on the first signal and the second feedback signal to obtain the first signal vector and the second signal vector in response to the first port being configured to transmit the first signal; and
   the first orthogonal receiver is configured to perform frequency mixing processing on the first signal and the third feedback signal and on the first signal and the fourth feedback signal to obtain the third signal vector and the fourth signal vector in response to the second port being configured to transmit the first signal.

8. The apparatus according to claim 7, wherein the apparatus further comprises a first splitter, and the first splitter is separately connected to the first port, the second port, and the first orthogonal receiver to separately input the first signal into the first port, the second port, and the first orthogonal receiver.

9. The apparatus according to claim 8, further comprising:
an input port configured to receive a first radio frequency signal, wherein
the first signal corresponds to the first radio frequency signal and is received by the input port; or
the apparatus further comprises a signal generator connected to the first splitter, the signal generator is configured to generate a second radio frequency signal, and the second radio frequency signal correspond to the first signal.

10. The apparatus according to claim 8, further comprising:
an input port configured to receive a first intermediate frequency signal, and
a mixer connected to the first splitter, and the mixer is configured to perform frequency mixing processing on the first intermediate frequency signal and a correction signal to obtain the first signal, wherein
the correction signal is received by the input port, or
the apparatus further comprises a signal generator, and the signal generator is configured to generate the correction signal.

11. The apparatus according to claim 8, further comprising:
an input port configured to receive a baseband signal, wherein
the first signal is received by the input port; or
the apparatus further comprises a signal generator connected to the first splitter, and the signal generator is configured to generate the first signal.

12. The apparatus according to claim 1, wherein the vector unit detector is further configured to:
separately perform detection at a third time based on a fifth feedback signal and a sixth feedback signal that are respectively received by the first measured channel and the second measured channel to thereby obtain a fifth signal vector and a sixth signal vector in response to the third port being configured to transmit a second signal; and
separately perform detection at a fourth time different from the third time based on a seventh feedback signal and an eighth feedback signal that are respectively output by the first measured channel and the second measured channel to thereby obtain a seventh signal vector and an eighth signal vector in response to the fourth port being configured to transmit the second signal,
wherein the fifth signal vector, the sixth signal vector, the seventh signal vector, and the eighth signal vector are useable to further calibrate the deviation between the first measured channel and the second measured channel.

13. The apparatus according to claim 12, further comprising:
a processor configured to calibrate the deviation between the first measured channel and the second measured channel based on the fifth signal vector, the sixth signal vector, the seventh signal vector, and the eighth signal vector.

14. The apparatus according to claim 13, wherein the processor configured to calibrate the deviation between the first measured channel and the second measured channel based on the fifth signal vector, the sixth signal vector, the seventh signal vector, and the eighth signal vector, the processor is further configured to:
determine a second deviation correction value between the first measured channel and the second measured channel based on the fifth signal vector, the sixth signal vector, the seventh signal vector, and the eighth signal vector; and
calibrate the deviation between the first measured channel and the second measured channel based on the second deviation correction value.

15. The apparatus according to claim 14, wherein the second deviation correction value comprises a second amplitude correction value and a second phase correction value.

16. The apparatus according to claim 15, further comprising: a second combiner and a second coupler, wherein the vector detector comprises a second orthogonal receiver; and
the first measured channel and the second measured channel are combined by the second combiner, and the second orthogonal receiver is connected to the second combiner by the second coupler;
the second orthogonal receiver is configured to perform frequency mixing processing on the second signal and the fifth feedback signal and on the second signal and the sixth feedback signal to obtain the fifth signal vector and the sixth signal vector in response to the third port being configured to transmit the second signal; and
the second orthogonal receiver is configured to perform frequency mixing processing on the second signal and the seventh feedback signal, and on the second signal and the eighth feedback signal to obtain the seventh signal vector and the eighth signal vector in response to the fourth port being configured to transmit the second signal.

17. The apparatus according to claim 16, wherein the apparatus further comprises a second splitter, and the second splitter is separately connected to the third port, the fourth port, and the second orthogonal receiver to separately input the second signal into the third port, the fourth port and the second orthogonal receiver.

18. The apparatus according to claim 1, wherein the first measured channel and the second measured channel are integrated into a same semiconductor chip, or the first measured channel and the second measured channel are integrated into different semiconductor chips.

19. A wireless communications device, comprising the transmission channel calibration apparatus according to claim 1.

* * * * *

UNITED STATES PATENT AND TRADEMARK OFFICE
CERTIFICATE OF CORRECTION

PATENT NO. : 11,784,727 B2
APPLICATION NO. : 17/558949
DATED : October 10, 2023
INVENTOR(S) : Mu Zhou It is certified that error appears in the above-identified patent and that said Letters Patent is hereby corrected as shown below:

In the Specification

Column 22, Line 33, should be replaced with the following:

$$\Delta\theta_{12} = \frac{1}{2}(\theta_1 + \theta_2 - \theta_3 - \theta_4)$$

Signed and Sealed this
Sixteenth Day of April, 2024

Katherine Kelly Vidal
*Director of the United States Patent and Trademark Office*